US012375322B2

(12) United States Patent
Xiao et al.

(10) Patent No.: US 12,375,322 B2
(45) Date of Patent: Jul. 29, 2025

(54) ANTENNA ELEMENT CALIBRATION ALGORITHM

(71) Applicant: QUALCOMM Incorporated, San Diego, CA (US)

(72) Inventors: Lei Xiao, San Jose, CA (US); Mark Wallace, Bedford, MA (US); Evgeny Levitan, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 18/406,774

(22) Filed: Jan. 8, 2024

(65) Prior Publication Data
US 2025/0227008 A1    Jul. 10, 2025

(51) Int. Cl.
*H04L 25/02*    (2006.01)
*H04L 25/49*    (2006.01)

(52) U.S. Cl.
CPC .......... *H04L 25/0202* (2013.01); *H04L 25/49* (2013.01)

(58) Field of Classification Search
CPC . H04L 25/02; H04L 25/0202; H04L 25/0204; H04L 25/024; H04L 25/0242; H04L 25/0212; H04L 25/022; H04L 25/40; H04L 25/49; H04L 1/02; H04L 1/06; H04L 1/0618; H04L 1/0675; H04L 1/0687; H04L 1/0693
See application file for complete search history.

(56) References Cited

U.S. PATENT DOCUMENTS

| | | | | |
|---|---|---|---|---|
| 6,141,393 A | * | 10/2000 | Thomas | H04L 25/0232 455/137 |
| 6,862,440 B2 | * | 3/2005 | Sampath | H04L 1/242 329/304 |
| 7,020,110 B2 | * | 3/2006 | Walton | H04L 1/06 370/335 |
| 7,158,579 B2 | * | 1/2007 | Hottinen | H04B 7/0615 375/267 |
| 7,623,590 B2 | * | 11/2009 | Hottinen | H04B 7/0617 375/267 |
| 7,668,269 B2 | * | 2/2010 | Ma | H04L 25/022 375/350 |
| 8,170,617 B2 | * | 5/2012 | Nassiri-Toussi | H04B 7/065 455/562.1 |

(Continued)

*Primary Examiner* — James M Perez
(74) *Attorney, Agent, or Firm* — QUALCOMM Incorporated

(57) ABSTRACT

Methods, systems, and devices for wireless communications are described. A wireless device may identify channel responses between antenna elements of antenna arrays of the wireless device and user equipments (UEs) at geographic locations within a coverage area of the wireless device. For example, the wireless device may identify the channel responses based on reference signal transmissions between the UEs and the wireless device. The wireless device may process the channel responses to identify one or more directional power peaks associated with the reference signal transmissions. The wireless device may, based on the one or more directional power peaks, detect phase error values, amplitude error values, or both common to the channel responses. The wireless device may adjust the signal communicated via at least a subset of the antenna elements based on the phase error values, the amplitude error values, or both and communicate with one or more of the UEs.

30 Claims, 11 Drawing Sheets

(56) References Cited

U.S. PATENT DOCUMENTS

| | | | | |
|---|---|---|---|---|
| 8,379,763 B2* | 2/2013 | Sawai | | H04L 25/0236 |
| | | | | 375/316 |
| 8,416,875 B2* | 4/2013 | Hottinen | | H04L 1/06 |
| | | | | 375/267 |
| 9,559,871 B2* | 1/2017 | Morgan | | H04L 25/0204 |
| 9,685,998 B2* | 6/2017 | Fujii | | H04B 7/0617 |
| 9,819,516 B2* | 11/2017 | Zirwas | | H04L 25/03891 |
| 10,021,583 B2* | 7/2018 | Cheng | | H04W 24/08 |
| 10,374,863 B2* | 8/2019 | Xu | | H04L 27/362 |
| 10,440,473 B1* | 10/2019 | Moore | | H04R 3/04 |
| 10,613,209 B2* | 4/2020 | Emami | | G08G 5/26 |
| 10,735,298 B2* | 8/2020 | Chen | | A61B 5/7253 |
| 10,742,475 B2* | 8/2020 | Lai | | H04L 25/0224 |
| 10,764,091 B2* | 9/2020 | Baudin | | H04B 7/086 |
| 10,809,370 B2* | 10/2020 | Kim | | G05D 1/0022 |
| 11,035,944 B2* | 6/2021 | Kim | | G08G 5/22 |
| 11,750,255 B1* | 9/2023 | Alpert | | H04B 7/024 |
| | | | | 375/267 |
| 2002/0181430 A1* | 12/2002 | Thomas | | H04L 1/0618 |
| | | | | 370/441 |
| 2003/0224750 A1* | 12/2003 | Sampath | | H04L 1/242 |
| | | | | 455/284 |
| 2005/0117677 A1* | 6/2005 | Sampath | | H04B 17/12 |
| | | | | 375/267 |
| 2007/0160165 A1* | 7/2007 | Morgan | | H04L 25/0204 |
| | | | | 375/299 |
| 2008/0080631 A1* | 4/2008 | Forenza | | H04B 7/0684 |
| | | | | 375/260 |
| 2008/0118004 A1* | 5/2008 | Forenza | | H04B 7/0684 |
| | | | | 375/299 |
| 2008/0130790 A1* | 6/2008 | Forenza | | H04L 27/2646 |
| | | | | 375/299 |
| 2008/0240031 A1* | 10/2008 | Nassiri-Toussi | | H04B 7/0848 |
| | | | | 370/329 |
| 2010/0111157 A1* | 5/2010 | Sawai | | H04L 25/0204 |
| | | | | 375/232 |
| 2013/0286960 A1* | 10/2013 | Li | | H04B 7/0684 |
| | | | | 370/329 |
| 2015/0092875 A1* | 4/2015 | Kim | | H04B 7/0632 |
| | | | | 375/267 |
| 2015/0198697 A1* | 7/2015 | Kishigami | | G01S 7/2923 |
| | | | | 342/145 |
| 2016/0043883 A1* | 2/2016 | Zirwas | | H04L 25/0204 |
| | | | | 370/329 |
| 2016/0156391 A1* | 6/2016 | Fujii | | H04L 25/0202 |
| | | | | 455/63.4 |
| 2016/0204508 A1* | 7/2016 | Christopher | | H01Q 1/246 |
| | | | | 342/377 |
| 2017/0047968 A1* | 2/2017 | Moshfeghi | | H04B 7/0617 |
| 2018/0054832 A1* | 2/2018 | Luo | | H04W 52/42 |
| 2019/0058530 A1* | 2/2019 | Rainish | | H04B 7/0617 |
| 2019/0097865 A1* | 3/2019 | Xu | | A61B 5/113 |
| 2019/0166030 A1* | 5/2019 | Chen | | H04L 7/042 |
| 2019/0296941 A1* | 9/2019 | Baudin | | H04L 25/0224 |
| 2019/0327124 A1* | 10/2019 | Lai | | G01S 5/017 |
| 2020/0021342 A1* | 1/2020 | Ge | | H01Q 3/46 |
| 2020/0191943 A1* | 6/2020 | Wu | | G01S 13/726 |
| 2020/0244430 A1* | 7/2020 | Karabinis | | H04L 5/04 |
| 2020/0395662 A1* | 12/2020 | Tervo | | H01Q 3/267 |
| 2021/0021297 A1* | 1/2021 | Smyth | | H04L 25/0204 |
| 2021/0152204 A1* | 5/2021 | Judell | | H04B 1/12 |
| 2021/0167996 A1* | 6/2021 | Ratnam | | H04B 7/0617 |
| 2022/0021427 A1* | 1/2022 | Mirzaee | | H04B 7/0617 |
| 2022/0096003 A1* | 3/2022 | Mai | | H04L 25/0226 |
| 2023/0188384 A1* | 6/2023 | Claffey | | H04L 25/022 |
| | | | | 375/262 |
| 2024/0129166 A1* | 4/2024 | Au | | H04L 27/2647 |

* cited by examiner

ANTENNA ELEMENT CALIBRATION ALGORITHM

FIELD OF TECHNOLOGY

The following relates to wireless communications, including an antenna element calibration algorithm.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE). Wireless devices, such as network entities and UEs, may communicate via antenna elements.

SUMMARY

The described techniques relate to improved methods, systems, devices, and apparatuses that support an antenna element calibration algorithm. Described herein are on-line receive and transmit chain calibration algorithm for array antennas, such as for a base station or other wireless device. For example, the described techniques provide for identifying, at a wireless device, channel responses between antenna elements of one or more antenna arrays of a wireless device and a set of user equipments (UEs) at geographic locations within a coverage area of the wireless device. For example, the wireless device may identify the channel responses based on reference signal transmissions between the UEs and the wireless device.

The wireless device may process the channel responses to identify one or more directional power peaks associated with the reference signal transmissions. The wireless device may, based on the one or more directional power peaks, detect a set of phase error values, amplitude error values, or both common to the channel responses. The wireless device may communicate with one or more of the UEs via a set of antenna elements, wherein the signal communicated via at least a subset of the set of antenna elements is adjusted according to the detected phase error values, amplitude error values, or both.

A method for wireless communications by a wireless device is described. The method may include identifying a set of multiple channel responses between a set of multiple antenna elements of one or more antenna arrays of the wireless device and a set of multiple UEs at a set of multiple geographic locations within a coverage area of the wireless device, where the set of multiple channel responses are based on a set of multiple reference signal transmissions between the set of multiple UEs and the wireless device, processing the set of multiple channel responses to identify one or more directional power peaks associated with the set of multiple reference signal transmissions, detecting a set of phase error values, a set of amplitude error values, or both that are common to the set of multiple channel responses based on the one or more directional power peaks, and communicating, via the set of multiple antenna elements, a signal including one or more messages with at least a subset of the set of multiple UEs, where the signal communicated via at least a subset of the set of multiple antenna elements is adjusted based on the set of phase error values, the set of amplitude error values, or both.

A wireless device for wireless communications is described. The wireless device may include one or more memories storing processor executable code, and one or more processors coupled with the one or more memories. The one or more processors may individually or collectively operable to execute the code to cause the wireless device to identify a set of multiple channel responses between a set of multiple antenna elements of one or more antenna arrays of the wireless device and a set of multiple UEs at a set of multiple geographic locations within a coverage area of the wireless device, where the set of multiple channel responses are based on a set of multiple reference signal transmissions between the set of multiple UEs and the wireless device, process the set of multiple channel responses to identify one or more directional power peaks associated with the set of multiple reference signal transmissions, detect a set of phase error values, a set of amplitude error values, or both that are common to the set of multiple channel responses based on the one or more directional power peaks, and communicate, via the set of multiple antenna elements, a signal including one or more messages with at least a subset of the set of multiple UEs, where the signal communicated via at least a subset of the set of multiple antenna elements is adjusted based on the set of phase error values, the set of amplitude error values, or both.

Another wireless device for wireless communications is described. The wireless device may include means for identifying a set of multiple channel responses between a set of multiple antenna elements of one or more antenna arrays of the wireless device and a set of multiple UEs at a set of multiple geographic locations within a coverage area of the wireless device, where the set of multiple channel responses are based on a set of multiple reference signal transmissions between the set of multiple UEs and the wireless device, means for processing the set of multiple channel responses to identify one or more directional power peaks associated with the set of multiple reference signal transmissions, means for detecting a set of phase error values, a set of amplitude error values, or both that are common to the set of multiple channel responses based on the one or more directional power peaks, and means for communicating, via the set of multiple antenna elements, a signal including one or more messages with at least a subset of the set of multiple UEs, where the signal communicated via at least a subset of the set of multiple antenna elements is adjusted based on the set of phase error values, the set of amplitude error values, or both.

A non-transitory computer-readable medium storing code for wireless communications is described. The code may include instructions executable by one or more processors to identify a set of multiple channel responses between a set of multiple antenna elements of one or more antenna arrays of the wireless device and a set of multiple UEs at a set of multiple geographic locations within a coverage area of the wireless device, where the set of multiple channel responses are based on a set of multiple reference signal transmissions between the set of multiple UEs and the wireless device, process the set of multiple channel responses to identify one or more directional power peaks associated with the set of multiple reference signal transmissions, detect a set of phase error values, a set of amplitude error values, or both that are common to the set of multiple channel responses based on the one or more directional power peaks, and communicate, via the set of multiple antenna elements, a signal including one or more messages with at least a subset of the set of multiple UEs, where the signal communicated via at least a subset of the set of multiple antenna elements is adjusted based on the set of phase error values, the set of amplitude error values, or both.

Some examples of the method, wireless devices, and non-transitory computer-readable medium described herein may further include operations, features, means, or instructions for receiving, from the set of multiple UEs, a set of multiple capability messages indicating that the set of multiple UEs may be capable of reporting an observed channel response that satisfies a defined granularity level, where the identifying further includes and receiving, from the set of multiple UEs, a set of multiple reporting messages indicating the set of multiple channel responses, where a granularity of each of the set of multiple channel responses satisfies the defined granularity level.

Some examples of the method, wireless devices, and non-transitory computer-readable medium described herein may further include operations, features, means, or instructions for transmitting a set of multiple capability report messages requesting the set of multiple UEs to each report a capability associated with reporting the observed channel response that satisfies the defined granularity level.

Some examples of the method, wireless devices, and non-transitory computer-readable medium described herein may further include operations, features, means, or instructions for transmitting a control message indicating a configuration to the set of multiple UEs that identifies one or more channel state information-reference signal (CSI-RS) resources to be monitored by the set of multiple UEs, transmitting one or more CSI-RS transmissions via the one or more CSI-RS resources, where the identifying further includes, and receiving, from the set of multiple UEs, a set of multiple reporting messages indicating the set of multiple channel responses based on the configuration.

Some examples of the method, wireless devices, and non-transitory computer-readable medium described herein may further include operations, features, means, or instructions for transmitting a control message indicating a configuration to the set of multiple UEs that identifies a set of multiple sounding reference signal (SRS) resources, where the identifying further includes and monitoring the set of multiple SRS resources to generate the set of multiple channel responses.

In some examples of the method, wireless devices, and non-transitory computer-readable medium described herein, identifying the set of multiple channel responses may include operations, features, means, or instructions for transmitting a set of multiple reference signals to the set of multiple UEs and receiving, from the set of multiple UEs, a set of multiple reporting messages indicating the set of multiple channel responses based on the set of multiple reference signals.

In some examples of the method, wireless devices, and non-transitory computer-readable medium described herein, the set of multiple reference signals may be CSI-RSs that may be transmitted via a set of multiple CSI-RS ports, and where each of the set of multiple CSI-RS ports may be mapped to a respective antenna element of the set of multiple antenna elements of the wireless device.

In some examples of the method, wireless devices, and non-transitory computer-readable medium described herein, processing the set of multiple channel responses to identify the one or more directional power peaks may include operations, features, means, or instructions for identifying the one or more directional power peaks based on a set of multiple gain-phase errors for the set of multiple channel responses, a set of multiple steering vectors associated with the set of multiple channel responses, or both.

In some examples of the method, wireless devices, and non-transitory computer-readable medium described herein, processing the set of multiple channel responses to identify the one or more directional power peaks may include operations, features, means, or instructions for identifying the one or more directional power peaks based on one or more power criterion.

In some examples of the method, wireless devices, and non-transitory computer-readable medium described herein, detecting the set of phase error values that may be common to the set of multiple channel responses may include operations, features, means, or instructions for identifying a set of multiple directions associated with the set of multiple UEs, the set of multiple directions corresponding to the set of multiple channel responses and detecting the set of phase error values based on the set of multiple directions and the set of multiple channel responses.

In some examples of the method, wireless devices, and non-transitory computer-readable medium described herein, processing the set of multiple channel responses to identify one or more directional power peaks may include operations, features, means, or instructions for determining a beam-space amplitude distribution based on pairs of channel responses from the set of multiple channel responses that may be associated with respective UE pairs from the set of multiple UEs, where the one or more directional power peaks may be identified based on the beam-space amplitude distribution.

In some examples of the method, wireless devices, and non-transitory computer-readable medium described herein, processing the set of multiple channel responses to identify one or more directional power peaks may include operations, features, means, or instructions for determining a set of multiple delta angles-of-arrival for a set of multiple sets of UE pairs from the set of multiple UEs based on pairs of channel responses from the set of multiple channel responses that may be associated with respective UE pairs from the set of multiple UEs, where the one or more directional power peaks may be identified based on the set of multiple delta angles-of-arrival.

In some examples of the method, wireless devices, and non-transitory computer-readable medium described herein, detecting the set of phase error values that may be common to the set of multiple channel responses may include operations, features, means, or instructions for spatially aligning the set of multiple channel responses by steering the set of multiple channel responses to a common reference to generate a set of multiple spatially aligned channel responses, where the set of phase error values may be detected based on the set of multiple spatially aligned channel responses.

In some examples of the method, wireless devices, and non-transitory computer-readable medium described herein, communicating via the directional beam may include operations, features, means, or instructions for receiving one or more messages via the directional beam, where the directional beam includes a receive beam.

In some examples of the method, wireless devices, and non-transitory computer-readable medium described herein, communicating via the directional beam may include operations, features, means, or instructions for transmitting one or more messages via the directional beam, where the directional beam includes a transmission beam.

In some examples of the method, wireless devices, and non-transitory computer-readable medium described herein, the set of multiple channel responses may be a set of multiple narrowband channel responses or a set of multiple wideband channel responses.

Some examples of the method, wireless devices, and non-transitory computer-readable medium described herein may further include operations, features, means, or instructions for receiving a set of multiple reporting messages indicating a second set of multiple channel responses from the set of multiple UEs and applying a transform technique to the second set of multiple channel responses to identify a set of multiple dominant delay paths, where the set of multiple channel responses may be identified based on the set of multiple dominant delay paths.

DETAILED DESCRIPTION

Figure 1:
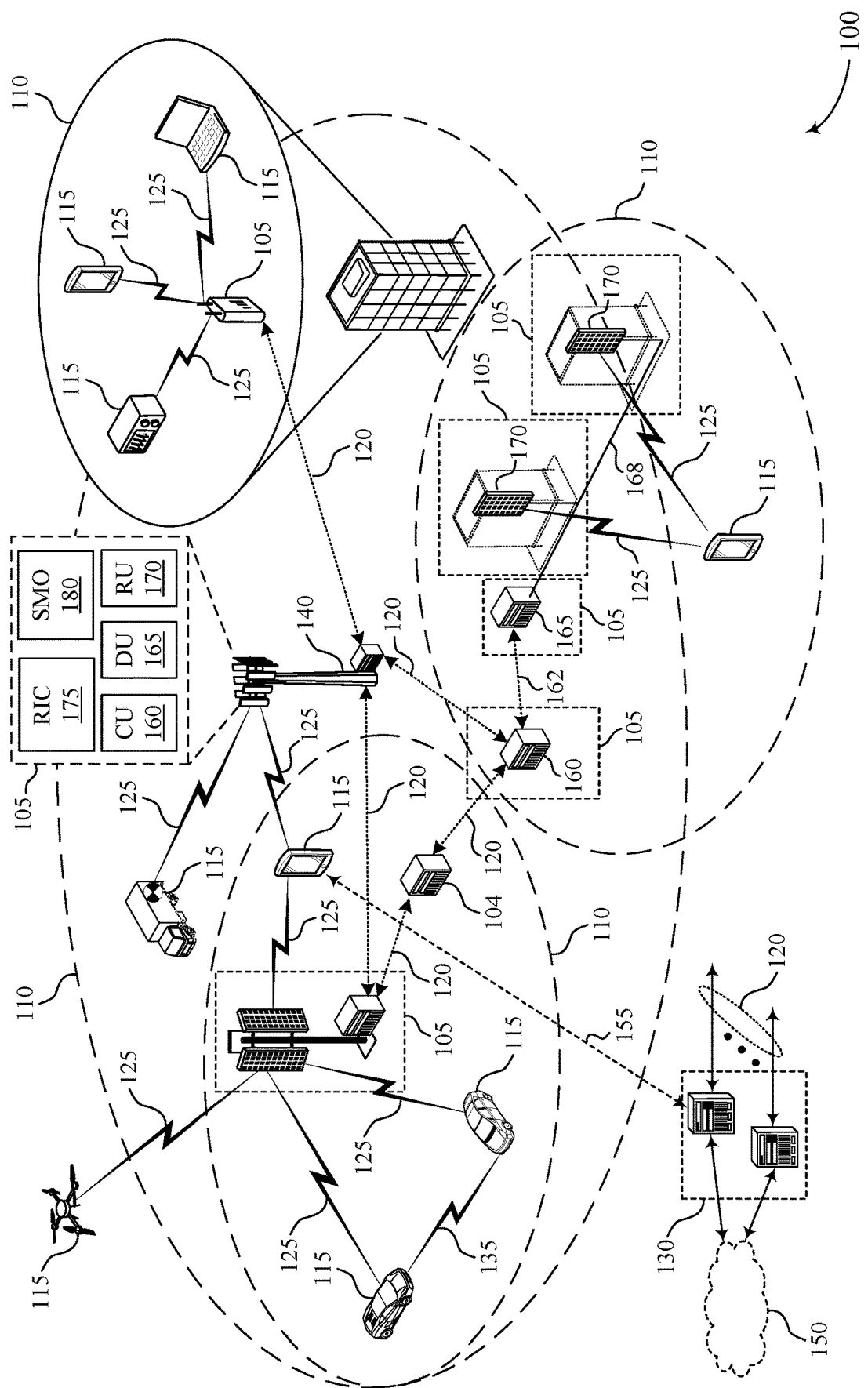
FIGS. 1 and 2 show examples of wireless communications systems that support an antenna element calibration algorithm in accordance with one or more aspects of the present disclosure.

Wireless devices may use an antenna array to transmit, receive, or both, directional beams. Directional beams may be created by linear phase steering of a two-dimensional rectangular array. In some examples, wireless devices may calibrate an antenna array. For example, wireless devices may calibrate antenna arrays for phase and gain matching to communicate narrow beams (e.g., high-gain directional beams). In some cases, relatively small changes (e.g., such as temperature variation and element aging) related to the antenna element or an environment of the antenna element may result in changes to a transmit and receive chain associated with the antenna array. For example, a wireless device may not receive a beam at an intended location, an intended angle, or the like based on changes to the transmit and receive chain associated with the antenna array. In some cases, a receiving device may calibrate an antenna array (e.g., a receiving antenna array) based on observation of reference signals (e.g., received reference signals). Additionally, or alternatively, wireless devices may perform reciprocity calibration. For example, wireless devices may match a relative phase of a transmit chain to a receive chain. In some examples, wireless devices may refrain from transmitting and receiving signals (e.g., go off-line) to perform calibration procedures.

As described herein, a wireless device, such as a network entity or a UE, may perform calibration for antenna elements. For example, the wireless device may adjust one or more antenna elements of a set of antenna elements according to the detected phase error values, amplitude error values, or both determined according to an antenna element calibration algorithm. The wireless device may identify channel responses between antenna elements of the wireless device and UEs within a coverage area of the wireless device. For example, the wireless device may identify the channel responses based on reference signals transmissions, such as channel state information-reference signals (CSI-RSs), sounding reference signals (SRSs), or the like, between the wireless device and the UEs (e.g., transmitted by or received by the wireless device). The wireless device may input the channel responses to the antenna element calibration algorithm to identify a set of phase error values, a set of amplitude error values, or both. For example, the wireless device may adjust the antenna beam weights and/or apply gain and phase adjustments per antenna element based on the set of phase error values, a set of amplitude error values, or both.

In some examples, the wireless device may request the UEs to report a capability to report a channel response satisfying a granularity level. For example, the wireless device may request that the UEs report whether the UEs are capable of reporting high-resolution channel responses.

Aspects of the disclosure are initially described in the context of wireless communications systems. Aspects of the disclosure are also described in the context of flowcharts and process flows. Aspects of the disclosure are further illustrated by and described with reference to apparatus diagrams, system diagrams, and flowcharts that relate to an antenna element calibration algorithm.

FIG. 1 shows an example of a wireless communications system 100 that supports an antenna element calibration algorithm in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, anode of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support an antenna element calibration algorithm as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a CSI-RS, which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Formation of high-gain directional beams with an array antenna may involve accurate phase and gain matching of antenna chains. However, temperature variation and element aging result in changes in the chain response so adjustment—in addition to initial calibration—may be used over time to maintain such matching. Transmit-side calibration is typically performed, since on the receive side, adjustments may be made by direct observation of reference signals. Reciprocity calibration, that is, matching of the relative phase of transmit and receive chains may be used. Transmit calibration may be achieved by a combination of reciprocity calibration plus receive-side calibration.

As discussed herein, techniques are described for receive-side calibration which aligns receivers based on observations of normal traffic over time. The technique described herein may be applied to multiple antenna systems. In technique discussed herein are described from the network entity perspective (e.g., from gNB perspective where a gNB calibrates using UE transmit signal), and may be applied by other types of wireless devices.

In some examples, a wireless device, such as the network entity 105 or the UE 115, may identify channel responses between antenna elements of one or more antenna arrays of the wireless device and UEs at geographic locations within a coverage area, such as the coverage area 110, of the wireless device. For example, the wireless device may identify the channel responses based on reference signal transmissions between the UEs and the wireless device. The wireless device may process the channel responses to identify one or more directional power peaks associated with the reference signal transmissions. The wireless device may, based on the one or more directional power peaks, detect a set of phase error values, amplitude error values, or both common to the channel responses. The wireless device may communicate with one or more of the UEs via at least one antenna element adjusted according to the set of phase error values, amplitude error values, or both.

Figure 2:
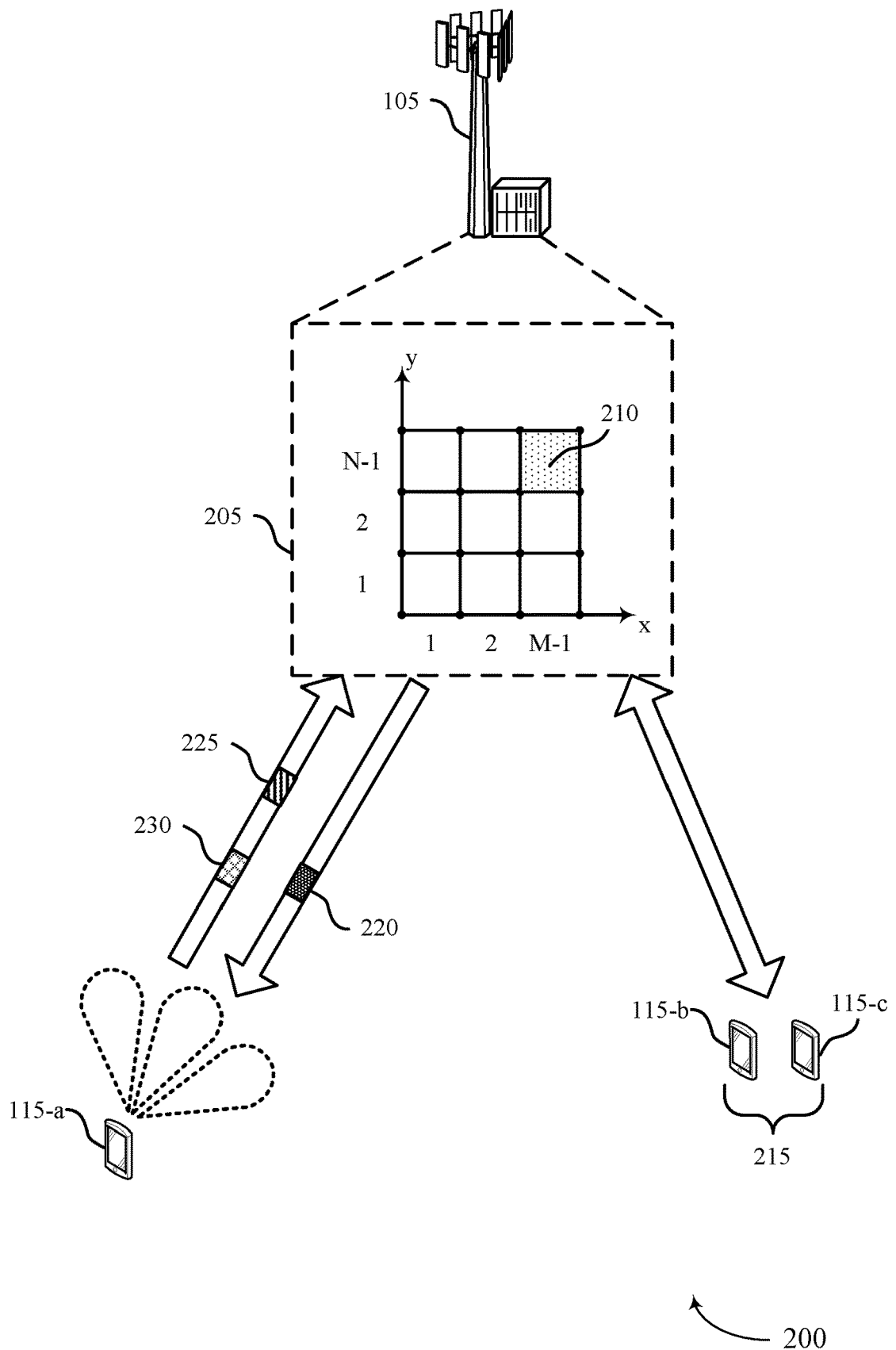

FIG. 2 shows an example of a wireless communications system 200 that supports an antenna element calibration algorithm in accordance with one or more aspects of the present disclosure. The wireless communications system 200 may implement or be implemented by various aspects of the wireless communications system 100. For example, the wireless communications system 200 may include a network entity 105, a UE 115-a, and a UE pair 215 including a UE 115-b and a UE 115-c, which may represent examples of corresponding devices as described with reference to FIG. 1.

The network entity 105 may communicate signals with one or more of the UE 115-a, the UE 115-b, or UE 115-c, via an antenna array 205. For example, the network entity 105 may include multiple antenna arrays, such as the antenna array 205. The antenna array 205 (or each antenna array at the network entity 105) may include multiple antenna elements. For example, the antenna array 205 may include M columns and N rows of antenna elements, where M and N are positive integers. M and N may be the same number, or may be different numbers. Each antenna element in the antenna array 205 may be denoted by a column and row pairing, (m, n), where m=0, 1, . . . M−1, and n=0, 1, . . . , N−1. As an example, the antenna array 205 may include an antenna element 210 at (M−1, N−1).

The signals received by the network entity 105 from the UE 115-a, the UE 115-b, or the UE 115-c may have phase errors, amplitude errors, or both at receive chains at the network entity 105. For example, the phase errors, the amplitude errors, or both may be residual post-calibration errors. The value of such residual post-calibration phase and/or amplitude error is unknown to network entity 105 or UEs but usually only slowly varying over time. For example, the network entity 105 may receive signals from UEs associated with different spatial variations. That is, the spatial variations of signals received by the network entity 105 from the UE 115-a, the UE 115-b, or the UE 115-c may be different as each signal has a different principal direction of power (e.g., or other multipath components), different angles-of-arrival (e.g., geographic locations of the UEs within a coverage area of the network entity 105), or both.

In some examples, the network entity 105 may account for the phase errors, amplitude errors, or both by applying a gain adjustment, a phase adjustment, or both to a signal received by one or more antenna elements of the antenna array 205. In other words, the network entity 105 may apply the gain adjustment, the phase adjustment, or both to a signal received by the one or more antenna elements of the antenna array to remove the phase error, amplitude error, or both associated with a respective antenna element.

The network entity 105 may determine gain adjustments, the phase adjustments, or both based on channel responses associated with the UEs at the different geolocations. For example, the UE 115-a, the UE 115-b, or the UE 115-c may experience a same phase error, amplitude error, or both at the different geolocations. Because the UE 115-a, the UE 115-b, and the UE 115-c experience the same phase error, amplitude error, or both at the different geolocations, measured channel responses (e.g., by the UE 115-a, the UE 115-b, or the UE 115-c or by the network entity 105) may be used to calculate the phase errors, amplitude errors, or both at the network entity. For example, one or more algorithms, such as the algorithms described elsewhere herein, including with reference to FIG. 3 and FIG. 4, may be used to calculate the phase errors, amplitude errors, or both at the network entity according to measured channel responses.

The signals received from the UE 115-a, the UE 115-b, or the UE 115-c (e.g., UEs in the field) may have spatial variations. That is, an average signal power from the UE 115-a, the UE 115-b, or the UE 115-c may vary based on a direction of arrival (e.g., with respect to the antenna array 205).

In some examples, a signal from the UE 115-a, the UE 115-b, or the UE 115-c may have a principal direction of power (e.g., a dominant direction), one or more multipath components which arrive from different angles, or both. For example, the UE 115-a may be associated with a different dominant power direction than the UE 115-b or the UE 115-c (e.g., because the UE 115-a is at a different geographic location than the UE 115-b or the UE 115-c within a coverage area of the network entity 105).

Given a set of measured channel responses of the UE 115-a, the UE 115-b, and the UE 115-c potentially measured at multiple times over multiple UE antenna ports, the network entity 105 may determine (e.g., compute) a set of amplitude and phase adjustments may be determined to enhance (e.g., maximize) the power received via a particular direction (e.g., the best direction) per UE, per port, per occasion, or any combination thereof. In some cases, a quantity of available channel responses may be large relative to the total quantity of receive chains. That is, if the adjustment were based on a single channel response, then the derived phase or amplitude solution would simply mirror the instantaneous response.

The network entity 105, based on a set of channel responses of the UE 115-a, the UE 115-b, and the UE 115-c, may determine a set of amplitude adjustments, a set of phase adjustments, or both, to apply to signals received by the antenna elements of the antenna array 205 to remove the phase error, amplitude error, or both from the received signals. In one examples, the network entity 105 may identify the set of amplitude adjustments, the set of phase adjustments, or both according to a power criterion (e.g., to maximize a power). Additionally, or alternatively, in another example, the network entity 105 may identify the set of amplitude adjustments, the set of phase adjustments, or both according to a UE (e.g., according to the UE 115-a, the UE 115-b, and the UE 115-c), according to a port (e.g., an antenna port), for a particular time occasion or any combination thereof.

The set of channel responses may be large relative to a quantity of receive chains (e.g., when the network entity 105 is to adjust a receive antenna) of the antenna array 205. For example, the set of channel responses may be large such that the set of amplitude adjustments, the set of phase adjustments, or both do not represent an instantaneous response (e.g., specific to a certain UE, port, occasion, etc.), but correct for errors across a relatively large quantity of responses. The network entity 105 may identify the channel responses over a set of UEs (e.g., including the UE 115-a, the UE 115-b, and the UE 115-c), at multiple times, over a set of antenna ports, or any combination thereof.

The network entity 105 may use an antenna element calibration algorithm to apply gain adjustments, phase adjustments, or both (e.g., according to the set of amplitude adjustments, the set of phase adjustments, or both) to one or more antenna elements of the set of antenna elements of the antenna array 205 of the network entity 105. For example, the antenna element calibration algorithm may include identifying, by the network entity, channel responses between the antenna array 205 of one or more antenna arrays of the network entity 105 and a set of UEs, including the UE 115-a and the UE pair 215. The antenna element calibration algorithm may further include processing the channel responses to identify one or more directional power peaks associated with reference signal transmissions between the network entity 105 and the set of UEs. Additionally, or alternatively, the network entity 105 may detect a set of phase error values, a set of amplitude error values, or both common to the identified channel responses based on the one or more directional power peaks. The network entity 105 may apply the gain adjustments, the phase adjustments, or both based on the detected set of phase error values, the set of amplitude error values, or both.

To determine the phase error values or amplitude error values and apply the gain or phase adjustments, the network entity 105 may transmit a request 220 that the UE 115-a, the UE 115-b, or the UE 115-c report a capability associated with reporting an observed channel response satisfying a granularity level. For example, the network entity 105 may request that the channel responses satisfy the granularity level (e.g., that the channel responses are high-resolution) in order to adjust a transmission gain, a transmission phase, or both of one or more antenna elements of the antenna array 205 of the network entity 105.

The UE 115-a, the UE 115-b, or the UE 115-c may transmit a capability message 225 to the network entity 105 indicating a capability to report the observed channel response satisfying the granularity level. For example, the UE 115-a, the UE 115-b, or the UE 115-c may transmit the capability message 225 in response to receiving the request 220.

In some examples, the network entity 105 may transmit CSI-RSs to UE 115-a, the UE 115-b, or the UE 115-c, and the UE 115-a, the UE 115-b, or the UE 115-c may transmit feedback including channel measurements or a processed quantity based on the channel measurements. In other words, the UE 115-a, the UE 115-b, or the UE 115-c may transmit reporting messages 230 indicating the channel responses. In some examples, the channel responses may satisfy the granularity level. The channel responses may be based on CSI-RSs received by the UE 115-a, the UE 115-b, or the UE 115-c from the network entity 105. For example, the network entity 105 may indicate one or more CSI-RS resources to be monitored by the UE 115-a, the UE 115-b, or the UE 115-c. In some examples, calibration of one or more transmit antennas of the network entity 105 may occur by a UE 115 transmitting a CSI-RS transmission where each CSI-RS port may be mapped to a respective transmit antenna (e.g., a single transmit antenna) of the network entity 105. In some examples, calibration of one or more transmit antennas of the network entity 105 may occur by measurement of a wireless channel by the UE 115 and subsequent feedback by the UE 115 of a channel estimate (e.g., one or more high resolution channel estimates) to the network entity 105. In some examples, feedback from the UE 115 may be achieved by app-driven upload to a server which then forwards data to the network entity 105, in accordance with a standard specifying a granularity of the feedback (e.g., high-resolution feedback). Once feedback is available at the network entity 105 for a set of UE's, an alignment procedure may be executed as described herein for transmit side calibration. As described herein, an online signal may be used to calibrate phase error, amplitude error, or both, for a transmit antenna of the network entity 105. Additionally, transmit antenna calibration and reciprocal calibration may be used to achieve receive antenna calibration at the network entity 105. Additionally, direct network entity transmit antenna calibration may be extended through the feedback by the UE (e.g., of high resolution channel estimates).

In some other examples, the network entity 105 may identify the channel responses based on monitoring SRS resources. For example, the network entity 105 may transmit control signaling to the UE 115-a, the UE 115-b, or the UE 115-c indicating SRS resources and monitor the SRS resources to generate the channel responses. The network entity 105 may perform a receive side calibration based on generating the channel responses after receiving the SRSs from the UEs. In other words, the network entity 105 may execute a receive side calibration after receiving SRS from the UE 115 or a transmit side calibration after receiving a CSI-RS report from the UE 115.

In some examples, the antenna element calibration algorithm may be applied to a radar system. For example, a radar network entity may identify one or more objects based on a received waveform. The radar network entity may perform the antenna element calibration algorithm according to the waveforms received based on the one or more objects (e.g., rather than the channel responses identified based on the set of UEs).

Figure 3:
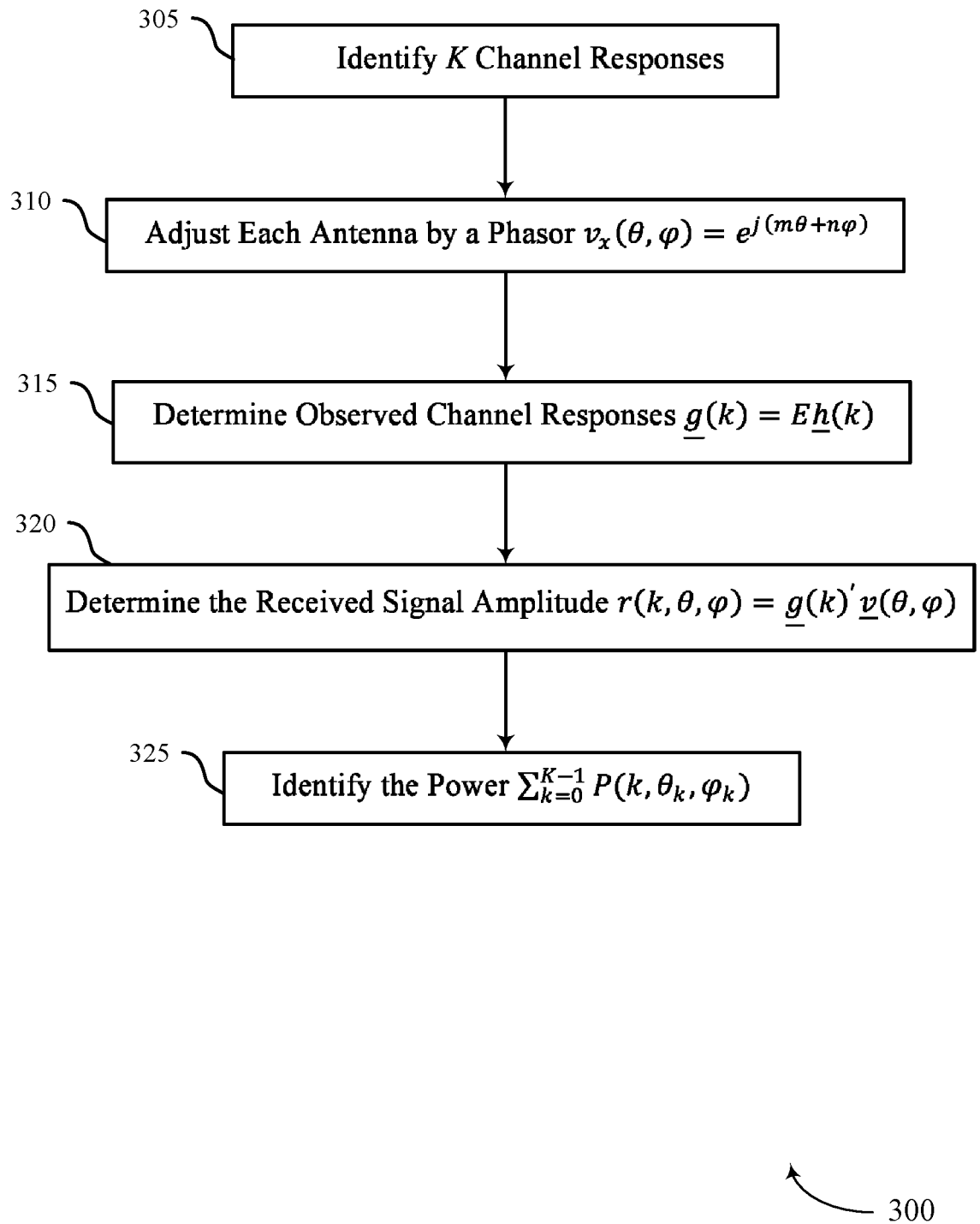
FIGS. 3 and 4 show examples of flowcharts that support an antenna element calibration algorithm in accordance with one or more aspects of the present disclosure.

FIG. 3 shows an example of a flowchart 300 that supports an antenna element calibration algorithm in accordance with one or more aspects of the present disclosure. Alternative examples of the following may be implemented, where some operations are performed in a different order than described or are not performed at all. In some cases, operations may include additional features not mentioned below, or further operations may be added. In some examples, the flowchart 300 may be performed by a wireless device, such as the network entity 105 as described with reference to FIGS. 1 and 2. Additionally, or alternatively, the flowchart 300 may be performed by a radar network entity, a gNB, or the like, which may be examples of the network entity 105.

A wireless device, such as the network entity, may implement the operations of the flowchart 300 to applying a gain adjustment, a phase adjustment, or both to one or more antenna elements of an antenna array and correct for phase errors, amplitude errors, or both associated with signals received from multiple UEs. The wireless device may transmit, receive, or both signals via one or more antenna arrays each including multiple antenna elements. For example, the wireless device may include an antenna array 205 (e.g., a rectangular antenna array) as described with reference to FIG. 2, having M columns and N rows of antenna elements with a total of X=MN antenna elements, where an antenna element may be denoted as the column and row pairing, (M, N). M and N are positive integers. M and N may be the same number, or may be different numbers. Each antenna element in the antenna array 205 may be denoted by a column and row pairing, (m, n), where m=0, 1, . . . M−1, and n=0, 1, . . . , N−1. As an example, the antenna array 205 may include an antenna element 210 at (M−1, N−1). As described herein, one or more equations of the flowchart may refer to an (m, n)th antenna element with reference to the columns and rows M and N, respectively, depicted in the antenna array 205 of FIG. 2.

At 305, the wireless device may identify a set of K channel responses $h_x(k)$ for a set of UEs or may receive a control message indicating the set of K channel responses $h_x(k)$ for the set of UE. For example, the wireless device may identify the channel responses $h_x(k)$ based on transmitting or receiving one or more reference signals between the wireless device and each UE of a set of UEs in a coverage area of the wireless device. The wireless device may receive an indication of the channel responses from the set of UEs or generate channel responses based on receiving reference signals from the UEs. The wireless device may determine or receive a set of K channel responses (e.g., narrowband channel responses) $h_x(k)$ where k=0, . . . , K−1 represents an index of the channel response (e.g., for a UE, a port, a time occasions, etc.), and x=0, . . . , X−1 represents an antenna element index of a respective antenna element of the antenna array of the wireless device.

At 310, the wireless device may perform linear phase steering of the antenna array by adjusting antenna elements by phase. For example, the wireless device may adjust each antenna element of the antenna array by a phasor $v_x(\theta, \varphi)$, where each phasor corresponds to an antenna element index x for an elevation steering θ (e.g., a phase increment between rows of the antenna array) and for an azimuth steering φ (e.g., a phase increment between columns of the antenna array). For example, the wireless device may adjust each antenna element by the phasor $v_x(\theta, \varphi)$ to achieve linear phase steering of the antenna array according to Equation 1 below where m=x mod M and n=⌋x/M⌋.

$$v_x(\theta,\varphi)=e^{j(m\theta+n\varphi)}, \qquad (1)$$

At 315, the wireless device may determine observed channel responses $\underline{g}(k)$. For example, the wireless device may determine the actual observed channel responses $\underline{g}(k)$ for the identified channel responses $h_x(k)$ based on a receive alignment error $\varepsilon_x$. For example, the wireless device may determine the actual observed channel responses by a product of a vector $\underline{h}(k)$ formed from the values along a diagonal matrix of identified channel responses $h_x(k)$ and a matrix E with diagonal values Ex according to Equation 2 below.

$$\underline{g}(k)=E\underline{h}(k) \quad (2)$$

At 320, the wireless device may determine a received signal amplitude $r(k, \theta, \varphi)$. For example, the wireless device may determine the received signal amplitude $r(k, \theta, \varphi)$ based on the observed channel responses $\underline{g}(k)$ and a steering vector $\underline{v}(\theta, \varphi)$ formed from the values along a diagonal matrix of the phasor $v_x(\theta, \varphi)$ according to Equation 3 below, where $\underline{g}(k)^*$ is a complex conjugate of the observed channel responses.

$$r(k,\theta,\varphi)=\underline{g}(k)^*v(\theta,\varphi) \quad (3)$$

Generally, a best linear-steered beam maximizes the power $|r(k, \theta, \varphi)|^2$. The highest average power over a diverse collection of channel responses may be achieved when the receivers are aligned. In other words, the highest average power may be achieved when the alignment error term Ex is 1 for all antennas. This holds if the channels have directional power peaks which are narrow relative to the array beamwidths.

At 325, the wireless device may identify the power $$\sum_{k=0}^{K-1} P(k, \theta_k, \varphi_k).$$

For example, the wireless device identify the power by calculating a vector c formed by the values along a diagonal matrix C with correction values $c_x$, where $c_x=1/\varepsilon_x$. Specifically, the wireless device may determine c and $\{\theta_k, \varphi_k\}$ where $\theta_k, \varphi_k \in [-+\pi, \pi]$ to maximize the power $$\sum_{k=0}^{K-1} P(k, \theta_k, \varphi_k).$$

according to Equation 4 below with the constraint that $\Sigma |c_x|^2 = X$.

$$P(k,\theta,\varphi)=|(C\underline{g}(k))^*\underline{v}(\theta,\varphi)|^2 \quad (4)$$

Additionally, or alternatively, the wireless device may determine 2K phases, X complex gains, or both, for a total quantity of measured values XK (e.g., complex values) based on a set of K channels being distinct. In other words, there are 2K phases plus X complex gains to enhance (e.g., optimize) the power, and the total number of measured (complex) values is XK so the enhancement (e.g., optimization) yields a meaningful solution when the set of K channels is distinct.

In some examples, the wireless device may determine a direction for each channel $\{\theta_k, \varphi_k\}$ based on determining that a set of receivers (e.g., receiving antenna elements) are aligned (e.g., within a threshold alignment). For example, the wireless device may determine the correction values $c_x$ (e.g., a set of phase error values, a set of amplitude error values, or both) based on the determined direction for each channel $\{\theta_k, \varphi_k\}$ (e.g., according to a gradient algorithm). In other words, the wireless device may determine a best direction for each channel (i.e., determine $\{\theta_k, \varphi_k\}$, k=0, ... K−1), without any correction term. An enhance (e.g., optimum) steering pair may be efficiently achieved by an oversampled two-dimensional DFT of the channel response plus interpolation for accurate peak detection. Once the steering values are determined, then the optimization problem is reduced to determination of the correction values $\{c_x\}$. In some examples, the wireless device may determine the correction values via a gradient algorithm.

Figure 4:
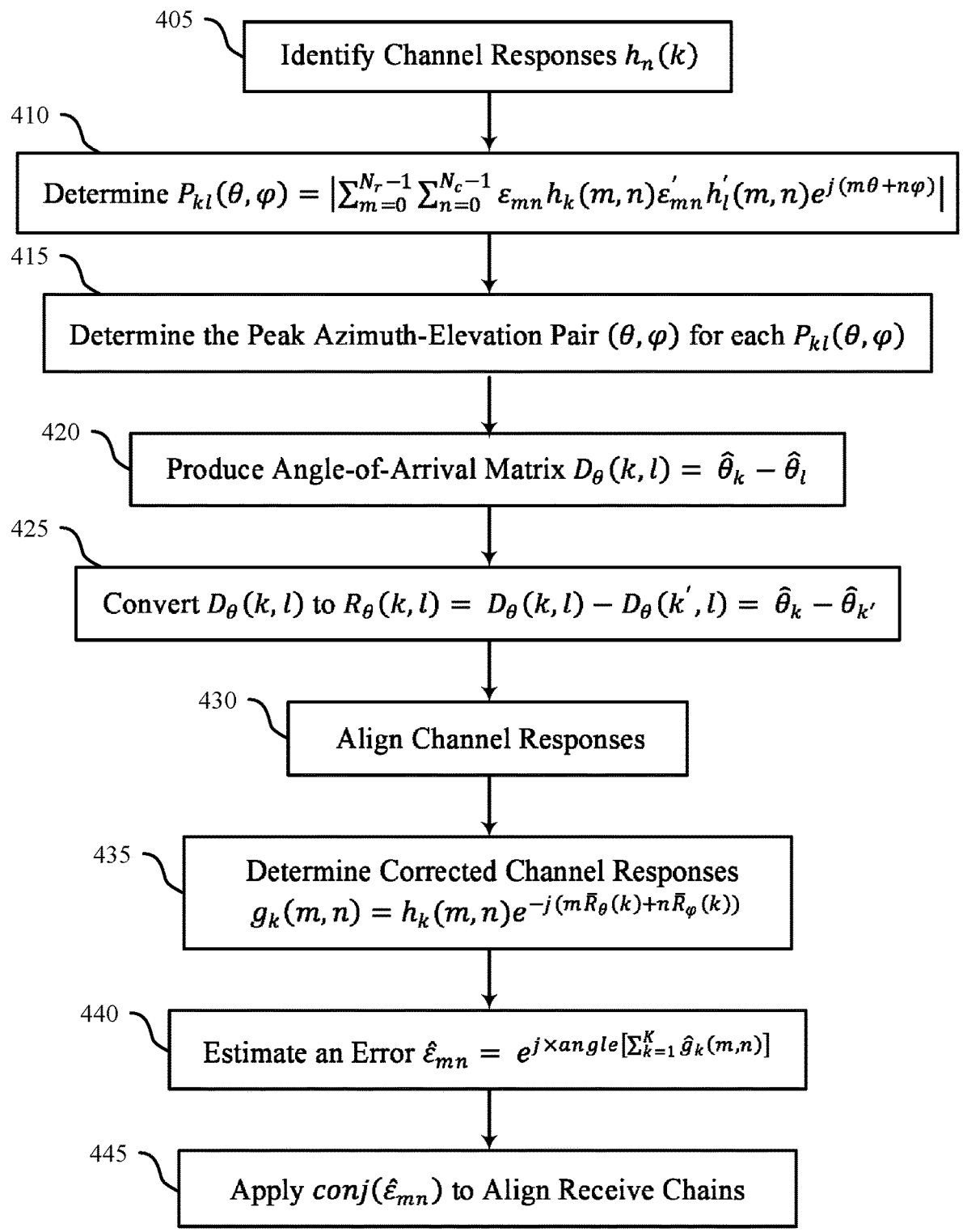

FIG. 4 shows an example of a flowchart 400 that supports an antenna element calibration algorithm in accordance with one or more aspects of the present disclosure. Alternative examples of the following may be implemented, where some operations are performed in a different order than described or are not performed at all. In some cases, operations may include additional features not mentioned below, or further operations may be added. In some examples, the flowchart 300 may be performed by a wireless device, such as the network entity 105 as described with reference to FIGS. 1 and 2. Additionally, or alternatively, the flowchart 300 may be performed by a radar network entity, a gNB, or the like, which may be examples of the network entity 105.

The network entity may implement the operations of the flowchart 400 to apply a gain adjustment, a phase adjustment, or both to one or more antenna elements and correct for phase errors associated with signals received from multiple UEs. The network entity may transmit, receive, or both signals via one or more antenna arrays each including multiple antenna elements. For example, the network entity may include an antenna array 205 as described with reference to FIG. 2, having M columns and N rows of antenna elements, where an antenna element may be denoted as the column and row pairing, (M, N). As described herein, one or more equations of the flowchart may refer to an (m, n)th antenna element with reference to the columns and rows M and N, respectively, depicted in the antenna array 205 of FIG. 2.

A wireless device may determine or receive a set of K channel responses (e.g., narrowband channel responses, wideband channel responses, etc.) where k represents an index of the channel response (e.g., for a UE, a port, a time occasions, etc.). In some examples, the quantity of K channel responses may be based on whether a dominant path exists for the channels. For example, fewer channel responses may exist if the channels tend toward a single dominant path, or, more channel responses may exist if there are multiple paths of a similar amplitude which arrive at widely spaced angles.

In some examples, if the antenna array (e.g., the receiver array) has sufficiently large phase errors on each receive chain, there may be little directionality evident from a transformation of the received signals to beam space. However, since all UEs experience the same, or nearly the same, phase errors, a procedure may be employed which examines UEs in pairs. The operations of the flowchart 400 may be implemented to examine the UEs in pairs.

At 405, the wireless device may identify or receive the set of K channel responses. For example, the wireless device may identify the K channel responses based on transmitting or receiving one or more reference signals between the wireless device and a UE of a set of UEs in a coverage area of the wireless device. The wireless device may receive an indication of the channel responses from the set of UEs or generate channel responses based on receiving reference signals from the UEs. In some examples, the wireless device may gather the set of K channel responses (e.g., 20 to 40 channel responses) for different UEs. The quantity of channel responses K may be less if the channels tend toward a single dominant path, and more if there are multipath paths of similar amplitude which arrive at widely spaced angles.

At 410, the wireless device may determine (e.g., compute) a beam-space amplitude distribution $P_{kl}(\theta, \varphi)$ of the correlation between respective pairs (k, l) of channel responses for an elevation steering θ (e.g., a phase increment between rows of the antenna array) and for an azimuth steering φ (e.g., a phase increment between columns of the antenna array). For example, the wireless device may determine the beam-space amplitude distribution $P_{kl}(\theta, \varphi)$ according to Equation 5 below where $h_k(m, n)$ may represent a channel response of an (m, n)th antenna element in a two-dimensional antenna array (e.g., array 205), where $\varepsilon_{mn}$ may represent an error in the (m, n)th antenna element, and where $h^*_l$ and $\varepsilon^*_{mn}$ may represent complex conjugates thereof.

$$P_{kl}(\theta, \varphi) = \left| \sum_{m=0}^{M-1} \sum_{n=0}^{N-1} \varepsilon_{mn} h_k(m, n) \varepsilon^*_{mn} h^*_l(m, n) e^{j(m\theta + n\varphi)} \right| \quad (5)$$

The error value $\varepsilon_{mn}$ may be associated with a magnitude (e.g., a magnitude of 1) and phase errors such that the product $\varepsilon_{mn}\varepsilon^*_{mn}=1$. In other words, the error value $\varepsilon_{mn}$ may be set to one as to focus on the phase error. The beam-space amplitude distribution $P_{kl}(\theta, \varphi)$ is not affected by receive chain phase errors. The beam-space amplitude distribution $P_{kl}(\theta, \varphi)$ may reflect a directionality of each of the pairs of UEs. In other words, the directionality of the pair of UEs may be reflected in the beam space characteristics of the correlation.

At 415, the wireless device may determine a peak azimuth-elevation pair (θ, φ) for each $P_{kl}(\theta, \varphi)$. For example, each UE may be associated with a dominant spatial cluster. In such examples, the peak azimuth-elevation pair (θ, φ) may indicate a difference in direction between the UEs of respective UE pairs.

The wireless device may compute $P_{kl}(\theta, \varphi)$ from an oversampled two dimensional DFT for the full range of azimuth and elevations. In some examples, $P_{kl}(\theta, \varphi)$ may also be used to determine the characteristics of convolved UE channels. Specifically, $P_{kl}(\theta, \varphi)$ may exhibit large secondary peaks in addition to the primary peak when the UEs have secondary clusters which are spatially distinct from the primary cluster. Signals with strong primary spatial clusters may be more sensitive to proper receive phases, so the accuracy of the algorithm may be improved when UEs with multiple strong clusters are eliminated from consideration.

For example, the wireless device may remove one or more UE pairs from the set of UE pairs based on determining the peak azimuth-elevation pair (θ, φ) for each of the $K^2$ terms of $P_{kl}(\theta, \varphi)$. For example, the wireless device may remove the one or more UE pairs having a secondary peak (e.g., different than the determined peak azimuth-elevation pair (θ, φ)) within a threshold (e.g., within 6 dB) of the azimuth-elevation pair (θ, φ) at a separation of at least a threshold phase (e.g., 25°). The UE may remove the one or more UE pairs to improve an accuracy of the antenna element calibration algorithm.

At 420, the wireless device may produce a delta angle-of-arrival matrix $D_\theta(k, l)$ and $D_\varphi(k, l)$ for a set of UE pairs for both azimuth and elevation. For example, the wireless device may produce the delta angle-of-arrival matrix for elevation and azimuth based on finding the peak azimuth-elevation pair (θ, φ) for each $P_{kl}(\theta, \varphi)$ at 415. The delta angle-of-arrival matrices for elevation and azimuth may represent estimated differences in arrival as demonstrated by Equation 6 and Equation 7 below.

$$D_\theta(k,l) = \hat{\theta}_k - \hat{\theta}_l \quad (6)$$

$$D_\varphi(k,l) = \hat{\varphi}_k - \hat{\varphi}_l \quad (7)$$

At 425, the wireless device may convert the delta angle-of-arrival matrices $D_\theta(k, l)$ and $D_\varphi(k, l)$ to relative angle-of-arrival matrices $R_\theta(k, l)$ and $R_\varphi(k, l)$. For example, the wireless device may convert each angle-of-arrival matrix to a set of absolute angles relative to a channel response k' of a selected UE according to Equation 8 and Equation 9 below.

$$R_\theta(k,l) = D_\theta(k,l) - D_\theta(k',l) = \hat{\theta}_k - \hat{\theta}_{k'}, \quad (8)$$

$$R_\varphi(k,l) = D_\varphi(k,l) - D_\varphi(k',l) = \hat{\varphi}_k - \hat{\varphi}_{k'}, \quad (9)$$

The wireless device may determine an average angle-of-arrival per UE by averaging the relative angle-of-arrival matrices $R_\theta(k, l)$ and $R_\varphi(k, l)$ over l. In some examples, entries of $R_\theta(k, l)$ and $R_\varphi(k, l)$ may not vary with l. except for estimation errors due to random channel characteristics. Thus, the wireless device may determine the average angle-of-arrival per UE by creating vectors according to Equation 10 and Equation 11 below.

$$\overline{R}_\theta(k) = \text{angle}\left[\frac{1}{K}\sum_{l=1}^{K} e^{jR_\theta(k,l)}\right] \quad (10)$$

$$\overline{R}_\varphi(k) = \text{angle}\left[\frac{1}{K}\sum_{l=1}^{K} e^{jR_\varphi(k,l)}\right] \quad (11)$$

The wireless device may, in some examples, average the angle-of-arrival matrices in a phasor space to avoid phase warping. Additionally, or alternatively, the wireless device may eliminate one or more entries of $R_\theta(k, l)$ and $R_\varphi(k, l)$ deviating from a mean $R_\theta(k, l)$ and $R_\varphi(k, l)$, respectively, by a threshold deviation. For example, the wireless device may generate an initial estimate of $\overline{R}_\theta(k)$ and $\overline{R}_\varphi(k)$, a corresponding variance for each, and eliminate the one or more entries of $R_\theta(k, l)$ and $R_\varphi(k, l)$ deviating from $\overline{R}_\theta(k)$ and $\overline{R}_\varphi(k)$ by greater than the threshold deviation (e.g., greater than two standard deviations from $\overline{R}_\theta(k)$ or $\overline{R}_\varphi(k)$). The wireless device may regenerate (e.g., recompute) $\overline{R}_\theta(k)$ and $\overline{R}_\varphi(k)$ after eliminating the one or more entries.

At 430, the wireless device may align the channel responses. For example, the wireless device may shift the channel responses spatially to align a principal cluster (e.g., an estimated principal cluster) across the UEs. The wireless device may align the channel responses by determining first corrected channel responses $g_k(m, n)$, which may steer to a common reference.

For example, at 435, the wireless device may determine the first corrected channel responses $g_k(m, n)$ according to Equation 12 below.

$$g_k(m,n) = h_k(m,n) e^{-j(m\overline{R}_\theta(k) + n\overline{R}_\varphi(k))} \quad (12)$$

The wireless device may determine a phase correction per UE α(k) to align the first corrected channel responses $g_k(m, n)$ according to a reference UE k̂ using Equation 13 below. That is, the $g_k(m, n)$ matrices may point in the same direction but have random phases, and, accordingly, the wireless device may align the phases among UEs by determining a phase correction per UE. For example, the wireless device may select the reference UE having the channel response k̂ based on one or more properties (e.g., favorable properties) at the UE, such as a power level (e.g., high power). The phase correction per UE α(k) may be an average phase relative to the channel response of the reference UE k.

$$\alpha(k) = \text{angle}\left[\sum_{m=0}^{M-1}\sum_{n=0}^{N-1} g_k(m,n)g_{\bar{k}}(m,n)^*\right] \quad (13)$$

The wireless device may generate a second corrected channel response $\hat{g}_k(m, n)$ using the phase correction per UE according to Equation 14 below.

$$\hat{g}_k(m,n) = g_k(m,n)e^{-j\alpha(k)} \quad (14)$$

At 440, the wireless device may estimate an error $\hat{\varepsilon}_{mn}$ based on the second corrected channel response $\hat{\varepsilon}_k(m, n)$ and according to Equation 15 below.

$$\hat{\varepsilon}_{mn} = e^{j\times\text{angle}[\sum_{k=1}^{K}\hat{g}_k(m,n)]} \quad (14)$$

At 445, the wireless device may apply the error value $\text{conj}(\hat{\varepsilon}_{mn})$ to align the receive chains. For example, the wireless device may apply the error value $\text{conj}(\hat{\varepsilon}_{mn})$ to antenna elements of an antenna array 205 as described with reference to FIG. 2. That is, the wireless device may apply error value $\text{conj}(\hat{\varepsilon}_{mn})$ to respective signals received on (m, n)th antenna elements as described with reference to the columns and rows M and N, respectively, depicted in the antenna array 205 of FIG. 2. In other words, the error value $\text{conj}(\hat{\varepsilon}_{mn})$ may be a set of error phase values that are applied to adjust the signal communicated via an antenna element for the set of antenna elements of an antenna array 205 to transmit or receive a signal including one or more messages.

The channel responses may correspond to narrowband channel responses in which the wireless device may determine channel responses as a single complex value $h_k(m, n)$ for a given UE (e.g., UE k) and antenna element (e.g., antenna element (m,n)). In some other examples, the channel responses may be wideband channel responses. For example, the wireless device may determine a set of complex values for different frequency bins for each UE, for antenna element, or both. In such examples, the wireless device may transform the wideband channel responses to a delay domain, an impulse-response representation, or the like via a transform technique, such as a fast Fourier transform (FFT), and select a dominant delay path. The wireless device may use a complex response associated with the selected dominant delay path as a channel response for the operations of the flowchart 400.

Additionally, or alternatively, the wireless device may apply the operations of the flowchart 400 to channel responses associated with a subset of frequencies. For example, the wireless device may apply the operations of the flowchart 400 to subsets of frequencies for wideband channel responses.

Additionally, or alternatively, the wireless device may align the receive chains at 445 to produce narrow receive beams. In some cases, an absolute orientation of the beams may not be possible, such as in a case where the initial receive chain phases are completely random, resulting in presence of a large offset. In such cases, if there is some reasonable initial calibration between receive chains, (e.g., phases match to within ~45 degrees), then the wireless device may adjust the error $\hat{\varepsilon}_{mn}$ to a boresight pointing angle based on a threshold initial calibration (e.g., phases of each receive chain within 45°) between the receive chains. In other words, the wireless device may transform the correction to beam space, determine the peak, and shift the peak to zero azimuth and elevation.

In some examples, the wireless device may use a collection of channel responses to adjust for amplitude imbalance among receive chains. Antenna elements that see a same average power from any given UE, but instantaneous power at any single frequency exhibits fading, which may be Rayleigh distributed. The wireless device may average received power over a number of UE's results in an estimate of amplitude imbalance which can achieve any desired degree of accuracy. Moreover, frequency-selective fading also increases the averaging effect which can reduce the number of channel responses required for a certain degree of accuracy.

Additionally, for dual-polarized arrays, each polarization may be aligned separately using the alignment algorithm described in FIG. 4. Typically, absolute alignment between polarizations may not be achieved since received signals on two polarizations typically have random phases even when arrays are aligned. This is not typically an issue as receive-side beams are single polarization, with combining of signals from the polarizations driven by reference signals. The reciprocity of alignment of corresponding transmit and receive antenna elements may allow for the creation of coherent dual-polarized TX beams since any phase delta present between the polarizations on the receive side is applied to the receive beams to achieve overall alignment.

These techniques may also be applied in wideband scenarios. For example, if wideband channel estimates are available, that is, estimates for a set of frequencies are given, then these may be treated as a set of distinct channel estimates, and the narrowband algorithm discussed herein may be applied to the set of distinct channel estimates. Doing so increases the set of K available responses, although there may be a correlation among the estimates for a single UE, a single port, or both, for different frequencies, and thus sufficient variation among the frequency samples may be applied to enhance the results. Alternatively, or additionally, the wideband channel estimates may be transformed to an impulse-response representation and use the dominant time-domain peaks in the narrowband calibration algorithm discussed herein. In some cases, doing so may have the advantage that signals which arrive at the same delay are frequently more concentrated in angle of arrival due to the geometry of reflection.

These techniques may also be applied to a radar system employing linear phased arrays where reflections are received from each object of a set of objects. As an additional operation, a radar system may first identify one or more objects from a received waveform. Once the one or more objects are identified, a portion of received signal (over frequency and time) from each detected object as a virtual transmitter (akin to UE described in the narrowband calibration algorithm) when performing calibration. Additionally, receive calibration may aid calibration by bringing additional range gain by creating a sharper transmit beam. Moreover, object location from radar processing may be used to aid processing (e.g., narrowing down or determining a desired (e.g., best) direction for each channel in the approach described herein).

These techniques may also be applied for beam orientation (e.g., absolute beam orientation). As noted here, the receive calibration algorithm may determine a set of beams having a defined directionality (e.g., with optimum directionality), where the set of beams is a set of orthogonal linear-phase steered beams. In some cases, the algorithm may not steer a particular beam into a known direction, and the set of beams may be rotated relative to boresight. One technique to achieve absolute orientation may involve use of an antenna pattern of individual antenna elements. These element patterns may allow full sector coverage, but, in some cases. gain rolls off at large off-boresight angles. The per-antenna-element average power may be computed as a function of a perceived angle (e.g., the strongest beam in the two-dimensional beam grid). An adjustment to the receive calibration values (e.g., linear phase ramp) may then be performed such that a boresight beam has all-zero phase steering. In some cases, power control may attempt to flatten receive power for a set of angles (e.g., for all angles), but an edge-of-coverage UE may experience a decrease in gain. The set of observed angles may also be used to achieve a defined orientation (e.g., absolute orientation), since a UE which is effectively outside of sector coverage may be served by another sector. In some cases, a DFT beam set (e.g., the full DFT beam set) may include one or more beams which are outside of sector coverage, and thus any such one or more beams may be used less frequently. Another technique involves the use of an initial calibration database to anchor beams to a grid (e.g., an absolute grid). Variations in conditions over temperature and time potentially may degrade the accuracy of the database, but parameters for absolute accuracy are generally less than those which impact beam-to-beam interference so this approach may provide satisfactory result. Also note that the set of phase corrections which are computed for a given set of UE channel estimates may be adjusted such that there is no average phase slope in the azimuth or elevation directions, to prevent a drift of beams as the phase correction process is repeated over time.

Figure 5:
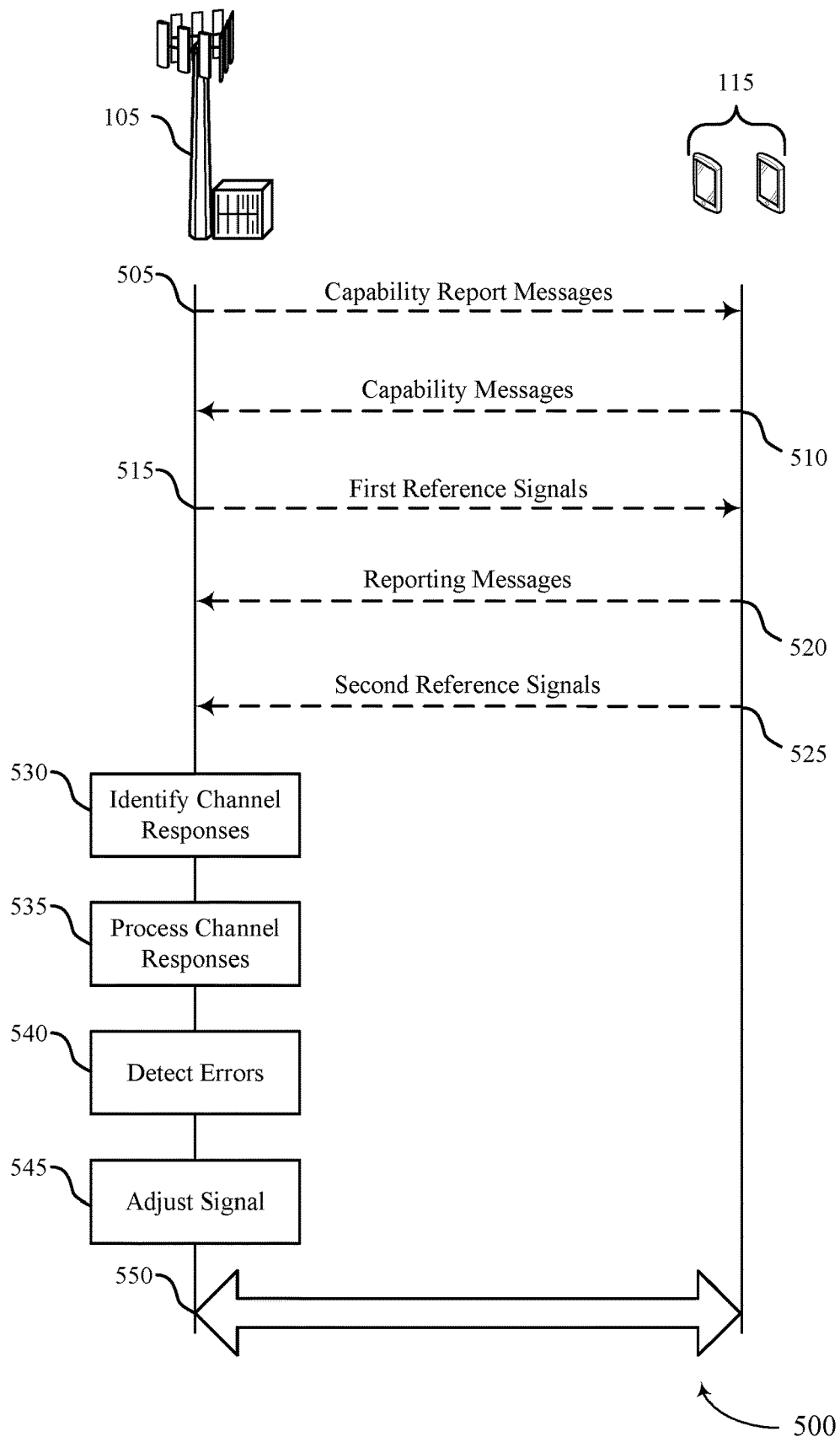
FIG. 5 shows an example of a process flow that supports an antenna element calibration algorithm in accordance with one or more aspects of the present disclosure.

FIG. 5 shows an example of a process flow 500 that supports an antenna element calibration algorithm in accordance with one or more aspects of the present disclosure. In some examples, the process flow 500 may implement or be implemented by aspects of the wireless communications system 100, the wireless communications system 200, and the flowcharts 300 and 400 as described with reference to FIGS. 1-4. For example, the process flow 500 may include a network entity 105 and UEs 115, which may be examples of corresponding devices as described with reference to FIGS. 1 and 2.

Alternative examples of the following may be implemented, where some operations are performed in a different order than described or are not performed at all. In some cases, operations may include additional features not mentioned below, or further operations may be added. Although the network entity 105 and the UE 115 are shown performing the operations of the process flow 500, some aspects of some operations may also be performed by one or more other wireless devices (such as by a radar base station, a gNB, or the like). The UEs 115, while shown including two UEs, may include multiple (e.g., more than two) UEs at multiple geographic locations within a coverage area of the network entity 105.

The network entity 105 may apply a gain adjustment, a phase adjustment, or both to antenna elements associated with the network entity 105 according to an antenna element calibration algorithm and based on channel responses between the antenna elements and the UEs 115.

At 505, the network entity 105 may transmit capability report messages to the UEs 115. The capability report messages may request the UEs 115 to each report a capability associated with reporting an observed channel response satisfying a granularity level. For example, the network entity 105 may request that the UEs 115 report detailed channel responses (e.g., high granularity level).

At 510, the UEs 115 may transmit capability messages to the network entity 105. For example, the UEs 115 may transmit the capability messages indicating that the UEs 115 are capable of reporting the observed channel response satisfying the granularity level (e.g., defined by the network entity 105 at the message received at 505). Of, the UEs 115 may transmit the capability messages indicating that the UEs 115 are not capable of reporting the observed channel response satisfying the granularity level. In some examples, the UEs 115 may transmit the capability messages at 510 based on receiving the capability report messages from the network entity 105 at 505.

At 515, the network entity 105 may transmit first reference signals to the UEs 115. For example, the network entity 105 may transmit the first reference signals to identify channel responses (e.g., at 530).

In some examples, the first reference signals may be CSI-RSs. For example, the network entity 105 may transmit a control message indicating a configuration to the UEs 115 that identifies one or more CSI-RS resources to be monitored by the UEs 115. The network entity 105 may transmit one or more CSI-RS transmissions (e.g., the first reference signals) via the one or more CSI-RS resources.

Additionally, or alternatively, the network entity 105 may transmit the CSI-RSs via multiple CSI-RS ports. The CSI-RS ports may be mapped to a respective antenna element of the antenna elements of the network entity 105.

At 520, the UEs 115 may transmit reporting messages to the network entity 105. For example, the reporting messages may indicate the channel responses. The network entity 105 may identify the channel responses (e.g., at 530) based on receiving the reporting messages.

In some examples, the UEs 115 may transmit the reporting messages at 520 based on receiving the first reference signals at 515. For example, the UEs 115 may transmit the reporting messages based on receiving the CSI-RS transmissions via the CSI-RS resources.

At 525, the UEs 115 may transmit second reference signals to the network entity 105. For example, the UEs 115 may transmit SRSs. The network entity 105 may transmit a control message indicating a configuration to the UEs 115 identifying SRS resources. The UEs 115 may transmit the SRSs based on the identified SRS resources.

In some examples, the network entity 105 may identify the channel responses (e.g., at 530) based on receiving the SRSs. For example, the network entity 105 may monitor the SRS resources to generate the channel responses.

At 530, the network entity 105 may identify the channel responses. For example, the network entity 105 may identify the channel responses between the antenna elements of one or more antenna arrays of the network entity 105 and the UEs 115. The channel responses may be referred to as a set of K channel responses as described with reference to FIG. 3 and FIG. 4. The channel responses may be based on reference signal transmissions between the UEs 115 and the network entity 105, such as the first reference signals at 515 or the second reference signals at 525. In some examples, the channel responses may be narrowband channel responses or wideband channel responses.

Additionally, or alternatively, the network entity 105 may apply a transform technique, such as a FFT, to the channel responses to identify dominant delay paths. For example, the network entity 105 may identify the channel responses based on the dominant delay paths.

At 535, the network entity 105 may process the channel responses. For example, the network entity 105 may process the channel responses to identify one or more directional power peaks associated with the reference signal transmissions.

In some examples, the network entity 105 may identify the one or more directional power peaks based on gain-phase errors for the channel responses, steering vectors associated with the channel responses, or both.

For example, the network entity 105 may receive k channel responses, $\underline{h}(k)$, and determine the observed channel responses, $\underline{g}(k)$, by correcting the channel responses according to gain-phase errors associated with each channel response, E. That is, the network entity 105 may identify the one or more directional power peaks based on gain-phase errors for the channel responses, which may be used to correct the channel responses (e.g., at 315 of the flowchart 300).

Additionally, or alternatively, the network entity 105 may receive the channel responses k at an elevation steering $\theta$ and an azimuth steering $\varphi$. The network entity 105 may identify a received signal amplitude r(k, $\theta$, $\varphi$) by adjusting the corrected channel responses $\underline{g}(k)$ according to the steering vectors $\underline{v}(\theta, \varphi)$ (e.g., at 320 of the flowchart 300).

In some examples, the network entity 105 may identify the one or more directional power peaks based on one or more power criterion. For example, the network entity 105 may identify the directional power peaks to maximize a power |r(k, $\theta$, $\varphi$)|$^2$ (e.g., at 325 of the flowchart 300), or, in some other examples, to surpass a threshold.

Additionally, or alternatively, the network entity 105 may identify the one or more directional power peaks based on determining a beam-space amplitude distribution. For example, the network entity 105 may determine the beam-space amplitude distribution $P_{kl}(\theta, \varphi)$ based on pairs of channel responses (k, l) from the channel responses that are associated with respective UE pairs from the UEs 115 (e.g., at 410 of the flowchart 400). That is, the UEs 115 may include multiple pairs of UEs.

In some examples, the network entity 105 may identify the one or more directional power peaks based on determining multiple delta angles-of-arrival for the respective UE pairs based on the pairs of channel responses. The network entity 105 may identify a peak azimuth-elevation pair ($\theta$, $\varphi$) for each term of $P_{kl}(\theta, \varphi)$ to produce a delta angle-of-arrival matrix $D_\theta(k, l)$ (e.g., at 415 and 420, respectively, of the flowchart 400).

At 540, the network entity 105 may detect phase errors, amplitude errors, or both. For example, the network entity 105 may detect a set of phase error values, a set of amplitude error values, or both common to the plurality of channel responses based on the directional power peaks (e.g., identified at 535). The set of phase error values may be referred to as $\hat{\varepsilon}_{mn}$ and determined as described with reference to FIG. 4 (e.g., at 440 of the flowchart 400). Additionally, or alternatively, the set of phase error values may be referred to as Ex and determined as described with reference to FIG. 3 (e.g., at 325 of the flowchart 300).

For example, the network entity 105 may detect the set of phase error values based on identifying directions associated with the UEs 115 corresponding to the channel responses. That is, the network entity 105 may identify an elevation steering $\theta$ and an azimuth steering $\varphi$ associated with the k channel responses. In some examples, the network entity 105 may perform a simplified antenna element calibration algorithm based on determining that an alignment of receivers of the network entity 105 is above a threshold. For example, the network entity 105 may determine that the alignment is above the threshold based on identifying the directions corresponding to the channel responses.

Additionally, or alternatively, the network entity 105 may detect the set of phase error values based on spatially aligning the channel responses. For example, the network entity 105 may spatially align the channel responses by steering the channel responses to a common reference to generate spatially aligned channel responses (e.g., at 430 of the flowchart 400).

At 545, the network entity 105 may apply a gain adjustment, a phase adjustment, or both, of a signal output at one or more of the antenna elements. For example, the network entity 105 may adjust a gain, a phase, or both, of a signal communicated (e.g., transmitted, received, or both) via at least one of or all of the antenna elements based on the set of phase error values (e.g., detected at 540). In other words, the network entity 105 may multiply a signal communicated (e.g., transmitted, received, or both) at an (m, n)th antenna element by conj($\hat{\varepsilon}_{mn}$) (e.g., as described with reference to the flowchart 400), where each $\hat{\varepsilon}_{mn}$ corresponds to an (m, n)th antenna element. Additionally, or alternatively, the network entity 105 may multiply a signal communicated (e.g., transmitted, received, or both) at an (m, n)th antenna element by $c_x = 1/\varepsilon_x$ (e.g., as described with reference to the flowchart 300).

At 550, the network entity 105 may communicate a signal including one or more messages via the antenna array according to the gain adjustment, the phase adjustment, or both, which may be applied to a signal communicated (e.g., transmitted, received, or both) at least one or up to all of the antenna elements of the antenna array. For example, the network entity 105 may communicate with the UEs 115 or one or more other devices in a coverage area of the network entity 105.

For example, the network entity 105 may receive the signal including the one or more messages via a directional beam, where the directional beam includes a receive beam or a transmit beam. Or, the network entity 105 may transmit the signal including the one or more messages via the directional beam, where the directional beam includes a transmission beam.

Figure 6:
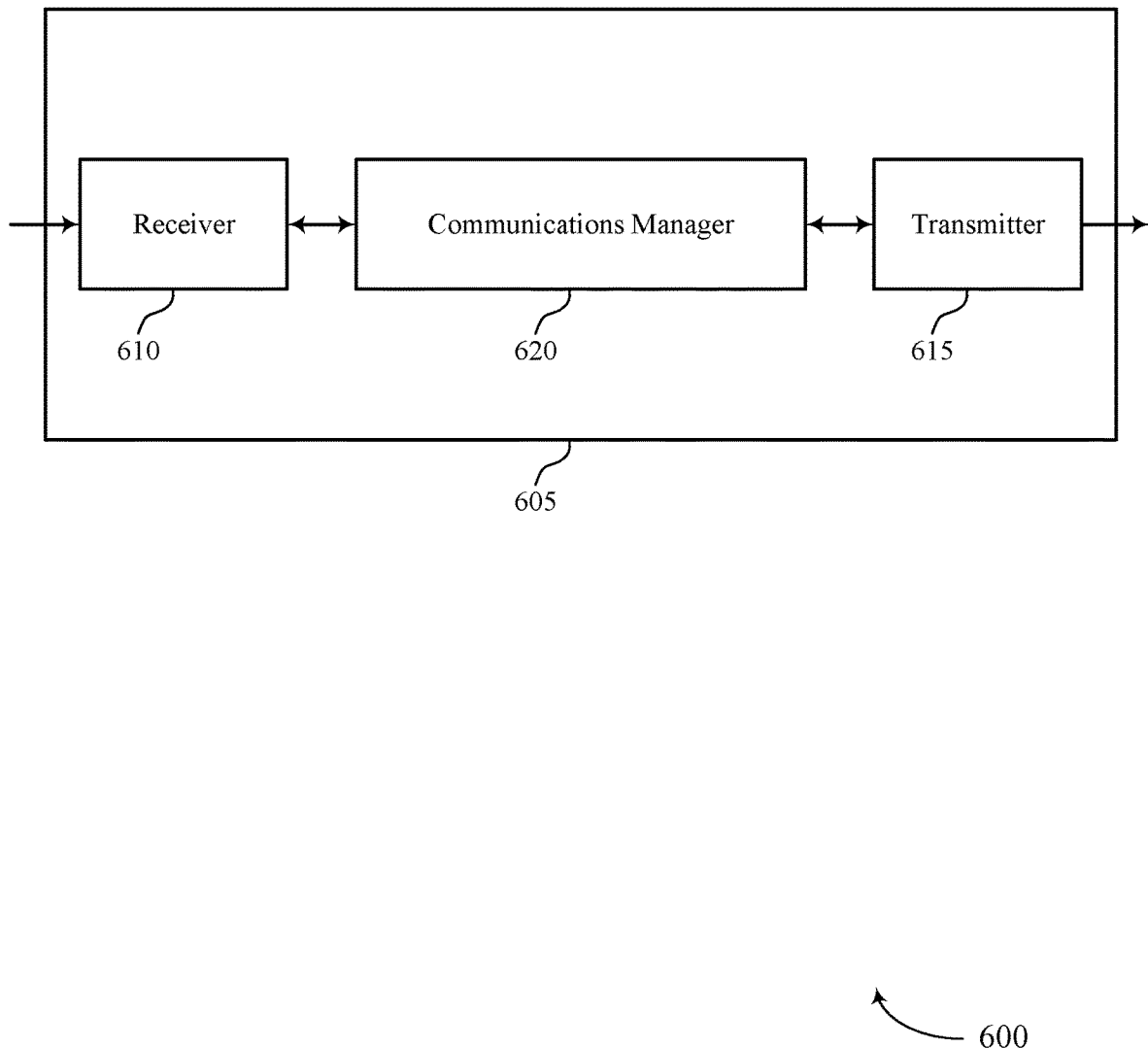
FIGS. 6 and 7 show block diagrams of devices that support an antenna element calibration algorithm in accordance with one or more aspects of the present disclosure.

FIG. 6 shows a block diagram 600 of a device 605 that supports an antenna element calibration algorithm in accordance with one or more aspects of the present disclosure. The device 605 may be an example of aspects of a network entity 105 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to, individually or collectively, support or enable the described techniques. Each of these components may be in communication with one another (e.g., via one or more buses).

The receiver 610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 605. In some examples, the receiver 610 may support obtaining information by receiving signals via one or more antennas. Additionally, or alternatively, the receiver 610 may support obtaining information by receiving signals via one or more wired (e.g., electrical, fiber optic) interfaces, wireless interfaces, or any combination thereof.

The transmitter 615 may provide a means for outputting (e.g., transmitting, providing, conveying, sending) information generated by other components of the device 605. For example, the transmitter 615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 615 may support outputting information by transmitting signals via one or more antennas. Additionally, or alternatively, the transmitter 615 may support outputting information by transmitting signals via one or more wired (e.g., electrical, fiber optic) interfaces, wireless interfaces, or any combination thereof. In some examples, the transmitter 615 and the receiver 610 may be co-located in a transceiver, which may include or be coupled with a modem.

The communications manager 620, the receiver 610, the transmitter 615, or various combinations thereof or various components thereof may be examples of means for performing various aspects of an antenna element calibration algorithm as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor. If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 is capable of, configured to, or operable to support a means for identifying a set of multiple channel responses between a set of multiple antenna elements of one or more antenna arrays of the wireless device and a set of multiple UEs at a set of multiple geographic locations within a coverage area of the wireless device, where the set of multiple channel responses are based on a set of multiple reference signal transmissions between the set of multiple UEs and the wireless device. The communications manager 620 is capable of, configured to, or operable to support a means for processing the set of multiple channel responses to identify one or more directional power peaks associated with the set of multiple reference signal transmissions. The communications manager 620 is capable of, configured to, or operable to support a means for detecting a set of phase error values, a set of amplitude error values, or both that are common to the set of multiple channel responses based on the one or more directional power peaks. The communications manager 620 is capable of, configured to, or operable to support a means for communicating, via the multiple antenna elements, a signal including one or more messages with at least a subset of the set of multiple UEs, where the signal communicated via at least a subset of the multiple of antenna elements is adjusted based on the set of phase error values, the set of amplitude error values, or both.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for reduced processing, reduced power consumption, and more efficient utilization of communication resources.

Figure 7:
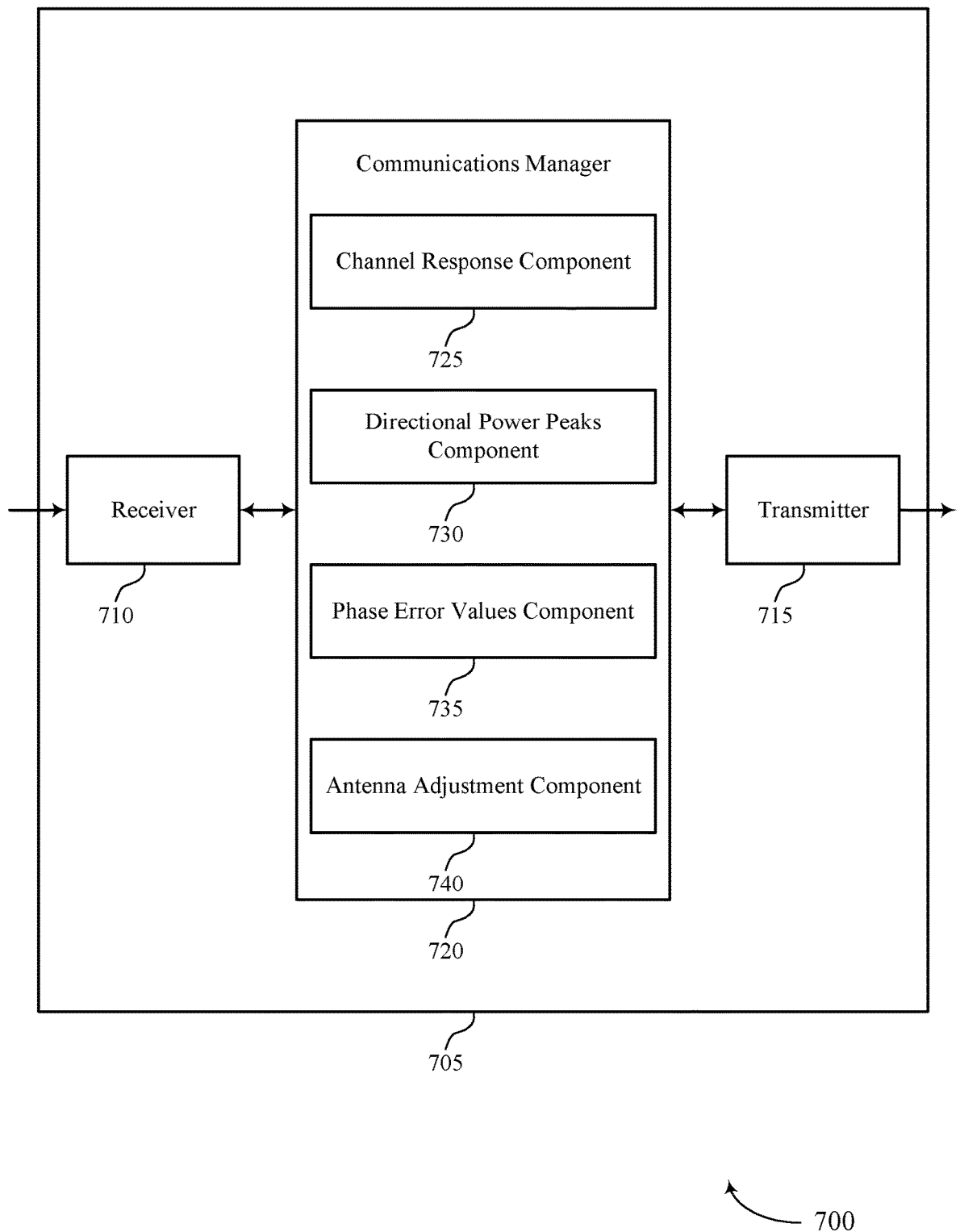

FIG. 7 shows a block diagram 700 of a device 705 that supports an antenna element calibration algorithm in accordance with one or more aspects of the present disclosure. The device 705 may be an example of aspects of a device 605 or a network entity 105 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to support the described techniques. Each of these components may be in communication with one another (e.g., via one or more buses).

The receiver 710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 705. In some examples, the receiver 710 may support obtaining information by receiving signals via one or more antennas. Additionally, or alternatively, the receiver 710 may support obtaining information by receiving signals via one or more wired (e.g., electrical, fiber optic) interfaces, wireless interfaces, or any combination thereof.

The transmitter 715 may provide a means for outputting (e.g., transmitting, providing, conveying, sending) information generated by other components of the device 705. For example, the transmitter 715 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 715 may support outputting information by transmitting signals via one or more antennas. Additionally, or alternatively, the transmitter 715 may support outputting information by transmitting signals via one or more wired (e.g., electrical, fiber optic) interfaces, wireless interfaces, or any combination thereof. In some examples, the transmitter 715 and the receiver 710 may be co-located in a transceiver, which may include or be coupled with a modem.

The device 705, or various components thereof, may be an example of means for performing various aspects of an antenna element calibration algorithm as described herein. For example, the communications manager 720 may include a channel response component 725, a directional power peaks component 730, a phase error values component 735, an antenna adjustment component 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The channel response component 725 is capable of, configured to, or operable to support a means for identifying a set of multiple channel responses between a set of multiple antenna elements of one or more antenna arrays of the wireless device and a set of multiple UEs at a set of multiple geographic locations within a coverage area of the wireless device, where the set of multiple channel responses are based on a set of multiple reference signal transmissions between the set of multiple UEs and the wireless device. The directional power peaks component 730 is capable of, configured to, or operable to support a means for processing the set of multiple channel responses to identify one or more directional power peaks associated with the set of multiple reference signal transmissions. The phase error values component 735 is capable of, configured to, or operable to support a means for detecting a set of phase error values, a set of amplitude error values, or both that are common to the set of multiple channel responses based on the one or more directional power peaks. The antenna adjustment component 740 is capable of, configured to, or operable to support a means for communicating, via the multiple antenna elements, a signal including one or more messages with at least a subset of the set of multiple UEs, where the signal communicated via at least a subset of the multiple of antenna elements is adjusted based on the set of phase error values, the set of amplitude error values, or both.

Figure 8:
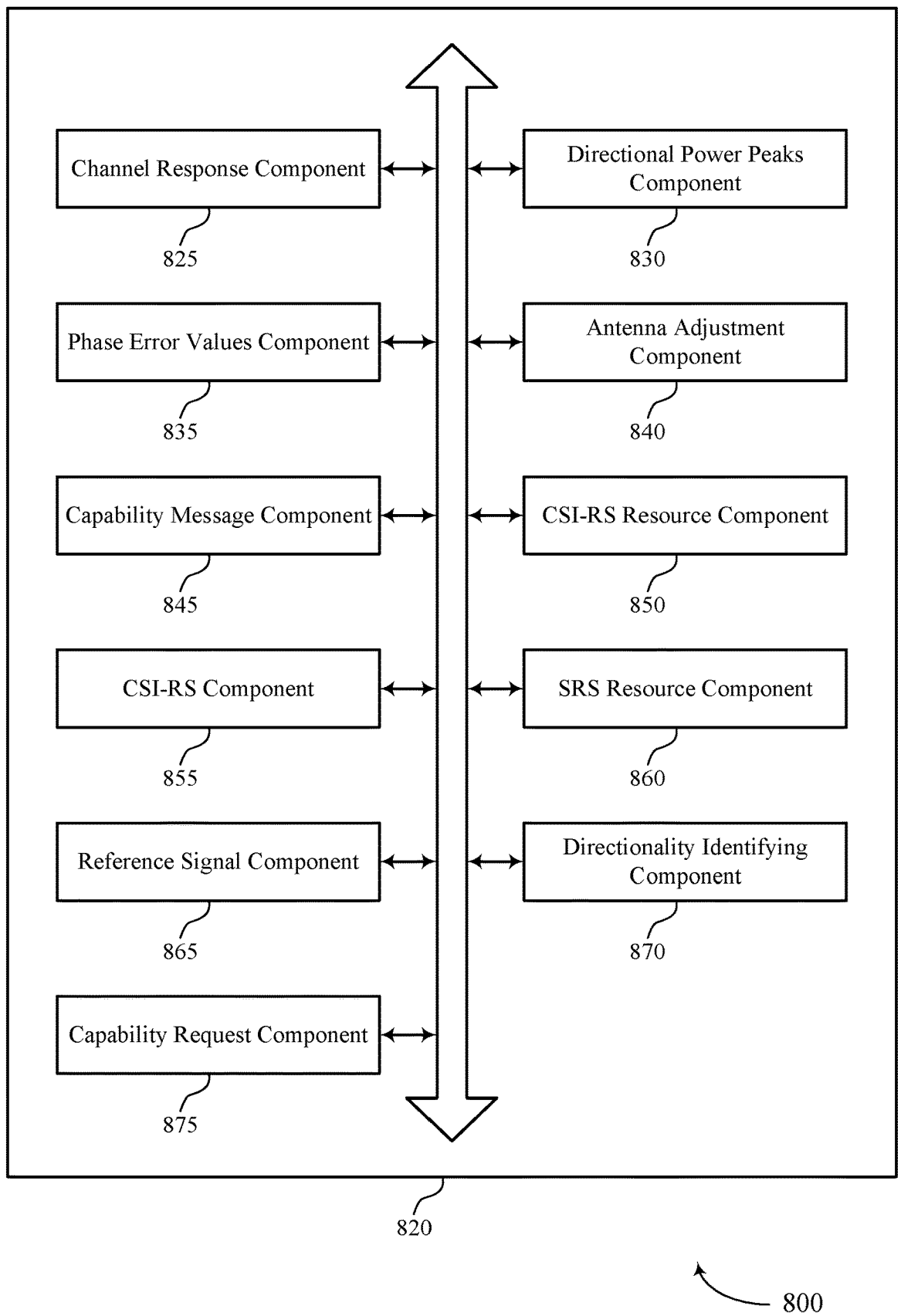
FIG. 8 shows a block diagram of a communications manager that supports an antenna element calibration algorithm in accordance with one or more aspects of the present disclosure.

FIG. 8 shows a block diagram 800 of a communications manager 820 that supports an antenna element calibration algorithm in accordance with one or more aspects of the present disclosure. The communications manager 820 may be an example of aspects of a communications manager 620, a communications manager 720, or both, as described herein. The communications manager 820, or various components thereof, may be an example of means for performing various aspects of an antenna element calibration algorithm as described herein. For example, the communications manager 820 may include a channel response component 825, a directional power peaks component 830, a phase error values component 835, an antenna adjustment component 840, a capability message component 845, a CSI-RS resource component 850, a CSI-RS component 855, an SRS resource component 860, a reference signal component 865, a directionality identifying component 870, a capability request component 875, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 820 may support wireless communications in accordance with examples as disclosed herein. The channel response component 825 is capable of, configured to, or operable to support a means for identifying a set of multiple channel responses between a set of multiple antenna elements of one or more antenna arrays of the wireless device and a set of multiple UEs at a set of multiple geographic locations within a coverage area of the wireless device, where the set of multiple channel responses are based on a set of multiple reference signal transmissions between the set of multiple UEs and the wireless device. The directional power peaks component 830 is capable of, configured to, or operable to support a means for processing the set of multiple channel responses to identify one or more directional power peaks associated with the set of multiple reference signal transmissions. The phase error values component 835 is capable of, configured to, or operable to support a means for detecting a set of phase error values, a set of amplitude error values, or both that are common to the set of multiple channel responses based on the one or more directional power peaks. The antenna adjustment component 840 is capable of, configured to, or operable to support a means for communicating, via the multiple antenna elements, a signal including one or more messages with at least a subset of the set of multiple UEs, where the signal communicated via at least a subset of the multiple of antenna elements is adjusted based on the set of phase error values, the set of amplitude error values, or both.

In some examples, the capability message component 845 is capable of, configured to, or operable to support a means for receiving, from the set of multiple UEs, a set of multiple capability messages indicating that the set of multiple UEs are capable of reporting an observed channel response that satisfies a defined granularity level, where the identifying is based on the observed channel response that satisfies the defined granularity level. In some examples, the channel response component 825 is capable of, configured to, or operable to support a means for receiving, from the set of multiple UEs, a set of multiple reporting messages indicating the set of multiple channel responses, where a granularity of each of the set of multiple channel responses satisfies the defined granularity level.

In some examples, the capability request component 875 is capable of, configured to, or operable to support a means for transmitting a set of multiple capability report messages requesting the set of multiple UEs to each report a capability associated with reporting the observed channel response that satisfies the defined granularity level.

In some examples, the CSI-RS resource component 850 is capable of, configured to, or operable to support a means for transmitting a control message indicating a configuration to the set of multiple UEs that identifies one or more channel state information-reference signal (CSI-RS) resources to be monitored by the set of multiple UEs. In some examples, the CSI-RS component 855 is capable of, configured to, or operable to support a means for transmitting one or more CSI-RS transmissions via the one or more CSI-RS resources, where the identifying further includes receiving reporting messages indicating the channel responses based on the configuration. In some examples, the channel response component 825 is capable of, configured to, or operable to support a means for receiving, from the set of multiple UEs, a set of multiple reporting messages indicating the set of multiple channel responses based on the configuration.

In some examples, the SRS resource component 860 is capable of, configured to, or operable to support a means for transmitting a control message indicating a configuration to the set of multiple UEs that identifies a set of multiple SRS resources, where the identifying further includes monitoring the multiple SRS resources to generate the channel responses. In some examples, the channel response component 825 is capable of, configured to, or operable to support a means for monitoring the set of multiple SRS resources to generate the set of multiple channel responses.

In some examples, to support identifying the set of multiple channel responses, the reference signal component 865 is capable of, configured to, or operable to support a means for transmitting a set of multiple reference signals to the set of multiple UEs. In some examples, to support identifying the set of multiple channel responses, the channel response component 825 is capable of, configured to, or operable to support a means for receiving, from the set of multiple UEs, a set of multiple reporting messages indicating the set of multiple channel responses based on the set of multiple reference signals.

In some examples, the set of multiple reference signals are channel state information-reference signals (CSI-RSs) that are transmitted via a set of multiple CSI-RS ports, and where each of the set of multiple CSI-RS ports is mapped to a respective antenna element of the set of multiple antenna elements of the wireless device.

In some examples, to support processing the set of multiple channel responses to identify the one or more directional power peaks, the directional power peaks component 830 is capable of, configured to, or operable to support a means for identifying the one or more directional power peaks based on a set of multiple gain-phase errors for the set of multiple channel responses, a set of multiple steering vectors associated with the set of multiple channel responses, or both.

In some examples, to support processing the set of multiple channel responses to identify the one or more directional power peaks, the directional power peaks component 830 is capable of, configured to, or operable to support a means for identifying the one or more directional power peaks based on one or more power criterion.

In some examples, to support detecting the set of phase error values that are common to the set of multiple channel responses, the directionality identifying component 870 is capable of, configured to, or operable to support a means for identifying a set of multiple directions associated with the set of multiple UEs, the set of multiple directions corresponding to the set of multiple channel responses. In some examples, to support detecting the set of phase error values that are common to the set of multiple channel responses, the phase error values component 835 is capable of, configured to, or operable to support a means for detecting the set of phase error values based on the set of multiple directions and the set of multiple channel responses.

In some examples, to support processing the set of multiple channel responses to identify one or more directional power peaks, the directional power peaks component 830 is capable of, configured to, or operable to support a means for determining a beam-space amplitude distribution based on pairs of channel responses from the set of multiple channel responses that are associated with respective UE pairs from the set of multiple UEs, where the one or more directional power peaks are identified based on the beam-space amplitude distribution.

In some examples, to support processing the set of multiple channel responses to identify one or more directional power peaks, the directional power peaks component 830 is capable of, configured to, or operable to support a means for determining a set of multiple delta angles-of-arrival for a set of multiple sets of UE pairs from the set of multiple UEs based on pairs of channel responses from the set of multiple channel responses that are associated with respective UE pairs from the set of multiple UEs, where the one or more directional power peaks are identified based on the set of multiple delta angles-of-arrival.

In some examples, to support detecting the set of phase error values that are common to the set of multiple channel responses, the phase error values component 835 is capable of, configured to, or operable to support a means for spatially aligning the set of multiple channel responses by steering the set of multiple channel responses to a common reference to generate a set of multiple spatially aligned channel responses, where the set of phase error values is detected based on the set of multiple spatially aligned channel responses.

In some examples, to support communicating via the directional beam, the antenna adjustment component 840 is capable of, configured to, or operable to support a means for receiving the signal including the one or more messages via a directional beam, where the directional beam includes a receive beam.

In some examples, to support communicating via the directional beam, the antenna adjustment component 840 is capable of, configured to, or operable to support a means for transmitting the signal including the one or more messages via the directional beam, where the directional beam includes a transmission beam.

In some examples, the set of multiple channel responses are a set of multiple narrowband channel responses or a set of multiple wideband channel responses.

In some examples, the channel response component 825 is capable of, configured to, or operable to support a means for receiving a set of multiple reporting messages indicating a second set of multiple channel responses from the set of multiple UEs. In some examples, the channel response component 825 is capable of, configured to, or operable to support a means for applying a transform technique to the second set of multiple channel responses to identify a set of multiple dominant delay paths, where the set of multiple channel responses are identified based on the set of multiple dominant delay paths.

Figure 9:
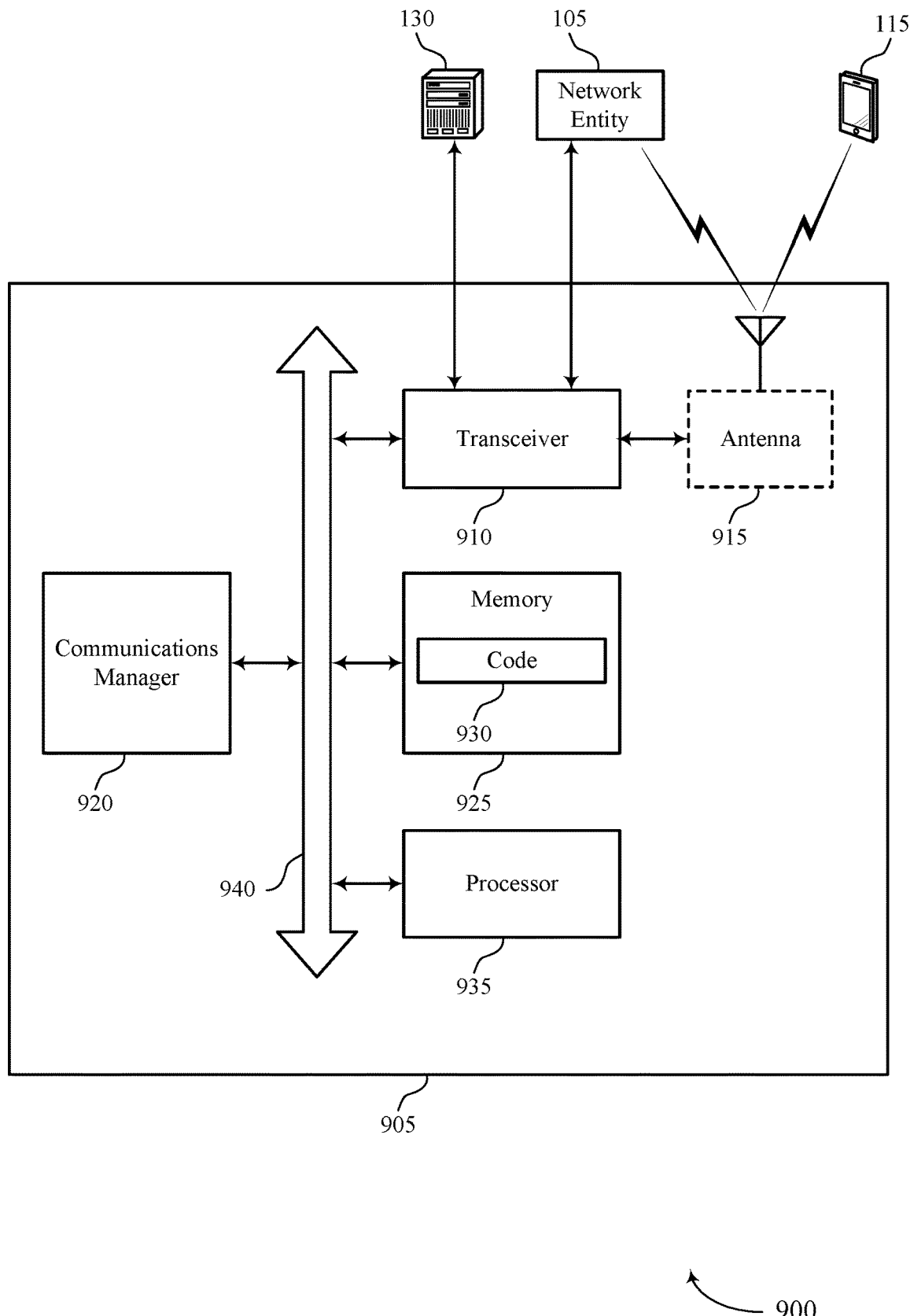
FIG. 9 shows a diagram of a system including a device that supports an antenna element calibration algorithm in accordance with one or more aspects of the present disclosure.

FIG. 9 shows a diagram of a system 900 including a device 905 that supports an antenna element calibration algorithm in accordance with one or more aspects of the present disclosure. The device 905 may be an example of or include the components of a device 605, a device 705, or a network entity 105 as described herein. The device 905 may communicate with one or more network entities 105, one or more UEs 115, or any combination thereof, which may include communications over one or more wired interfaces, over one or more wireless interfaces, or any combination thereof. The device 905 may include components that support outputting and obtaining communications, such as a communications manager 920, a transceiver 910, an antenna 915, at least one memory 925, code 930, and at least one processor 935. These components may be in electronic communication or otherwise coupled (e.g., operatively, communicatively, functionally, electronically, electrically) via one or more buses (e.g., a bus 940).

The transceiver 910 may support bi-directional communications via wired links, wireless links, or both as described herein. In some examples, the transceiver 910 may include a wired transceiver and may communicate bi-directionally with another wired transceiver. Additionally, or alternatively, in some examples, the transceiver 910 may include a wireless transceiver and may communicate bi-directionally with another wireless transceiver. In some examples, the device 905 may include one or more antennas 915, which may be capable of transmitting or receiving wireless transmissions (e.g., concurrently). The transceiver 910 may also include a modem to modulate signals, to provide the modulated signals for transmission (e.g., by one or more antennas 915, by a wired transmitter), to receive modulated signals (e.g., from one or more antennas 915, from a wired receiver), and to demodulate signals. In some implementations, the transceiver 910 may include one or more interfaces, such as one or more interfaces coupled with the one or more antennas 915 that are configured to support various receiving or obtaining operations, or one or more interfaces coupled with the one or more antennas 915 that are configured to support various transmitting or outputting operations, or a combination thereof. In some implementations, the transceiver 910 may include or be configured for coupling with one or more processors or one or more memory components that are operable to perform or support operations based on received or obtained information or signals, or to generate information or other signals for transmission or other outputting, or any combination thereof. In some implementations, the transceiver 910, or the transceiver 910 and the one or more antennas 915, or the transceiver 910 and the one or more antennas 915 and one or more processors or one or more memory components (e.g., the at least one processor 935, the at least one memory 925, or both), may be included in a chip or chip assembly that is installed in the device 905. In some examples, the transceiver 910 may be operable to support communications via one or more communications links (e.g., a communication link 125, a backhaul communication link 120, a midhaul communication link 162, a fronthaul communication link 168).

The at least one memory 925 may include RAM, ROM, or any combination thereof. The at least one memory 925 may store computer-readable, computer-executable code 930 including instructions that, when executed by one or more of the at least one processor 935, cause the device 905 to perform various functions described herein. The code 930 may be stored in a non-transitory computer-readable medium such as system memory or another type of memory. In some cases, the code 930 may not be directly executable by a processor of the at least one processor 935 but may cause a computer (e.g., when compiled and executed) to perform functions described herein. In some cases, the at least one memory 925 may contain, among other things, a BIOS which may control basic hardware or software operation such as the interaction with peripheral components or devices. In some examples, the at least one processor 935 may include multiple processors and the at least one memory 925 may include multiple memories. One or more of the multiple processors may be coupled with one or more of the multiple memories which may, individually or collectively, be configured to perform various functions herein (for example, as part of a processing system).

The at least one processor 935 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 935 may be configured to operate a memory array using a memory controller. In some other cases, a memory controller may be integrated into one or more of the at least one processor 935. The at least one processor 935 may be configured to execute computer-readable instructions stored in a memory (e.g., one or more of the at least one memory 925) to cause the device 905 to perform various functions (e.g., functions or tasks supporting an antenna element calibration algorithm). For example, the device 905 or a component of the device 905 may include at least one processor 935 and at least one memory 925 coupled with one or more of the at least one processor 935, the at least one processor 935 and the at least one memory 925 configured to perform various functions described herein. The at least one processor 935 may be an example of a cloud-computing platform (e.g., one or more physical nodes and supporting software such as operating systems, virtual machines, or container instances) that may host the functions (e.g., by executing code 930) to perform the functions of the device 905. The at least one processor 935 may be any one or more suitable processors capable of executing scripts or instructions of one or more software programs stored in the device 905 (such as within one or more of the at least one memory 925). In some examples, the at least one processor 935 may include multiple processors and the at least one memory 925 may include multiple memories. One or more of the multiple processors may be coupled with one or more of the multiple memories, which may, individually or collectively, be configured to perform various functions herein. In some examples, the at least one processor 935 may be a component of a processing system, which may refer to a system (such as a series) of machines, circuitry (including, for example, one or both of processor circuitry (which may include the at least one processor 935) and memory circuitry (which may include the at least one memory 925)), or components, that receives or obtains inputs and processes the inputs to produce, generate, or obtain a set of outputs. The processing system may be configured to perform one or more of the functions described herein. As such, the at least one processor 935 or a processing system including the at least one processor 935 may be configured to, configurable to, or operable to cause the device 905 to perform one or more of the functions described herein. Further, as described herein, being "configured to," being "configurable to," and being "operable to" may be used interchangeably and may be associated with a capability, when executing code stored in the at least one memory 925 or otherwise, to perform one or more of the functions described herein.

In some examples, a bus 940 may support communications of (e.g., within) a protocol layer of a protocol stack. In some examples, a bus 940 may support communications associated with a logical channel of a protocol stack (e.g., between protocol layers of a protocol stack), which may include communications performed within a component of the device 905, or between different components of the device 905 that may be co-located or located in different locations (e.g., where the device 905 may refer to a system in which one or more of the communications manager 920, the transceiver 910, the at least one memory 925, the code 930, and the at least one processor 935 may be located in one of the different components or divided between different components).

In some examples, the communications manager 920 may manage aspects of communications with a core network 130 (e.g., via one or more wired or wireless backhaul links). For example, the communications manager 920 may manage the transfer of data communications for client devices, such as one or more UEs 115. In some examples, the communications manager 920 may manage communications with other network entities 105, and may include a controller or scheduler for controlling communications with UEs 115 in cooperation with other network entities 105. In some examples, the communications manager 920 may support an X2 interface within an LTE/LTE-A wireless communications network technology to provide communication between network entities 105.

The communications manager 920 may support wireless communications in accordance with examples as disclosed herein. For example, the communications manager 920 is capable of, configured to, or operable to support a means for identifying a set of multiple channel responses between a set of multiple antenna elements of one or more antenna arrays of the wireless device and a set of multiple UEs at a set of multiple geographic locations within a coverage area of the wireless device, where the set of multiple channel responses are based on a set of multiple reference signal transmissions between the set of multiple UEs and the wireless device. The communications manager 920 is capable of, configured to, or operable to support a means for processing the set of multiple channel responses to identify one or more directional power peaks associated with the set of multiple reference signal transmissions. The communications manager 920 is capable of, configured to, or operable to support a means for detecting a set of phase error values, a set of amplitude error values, or both that are common to the set of multiple channel responses based on the one or more directional power peaks. The communications manager 920 is capable of, configured to, or operable to support a means for communicating, via the multiple antenna elements, a signal including one or more messages with at least a subset of the set of multiple UEs, where the signal communicated via at least a subset of the multiple of antenna elements is adjusted based on the set of phase error values, the set of amplitude error values, or both.

By including or configuring the communications manager 920 in accordance with examples as described herein, the device 905 may support techniques for improved communication reliability, more efficient utilization of communication resources, and improved coordination between devices.

In some examples, the communications manager 920 may be configured to perform various operations (e.g., receiving, obtaining, monitoring, outputting, transmitting) using or otherwise in cooperation with the transceiver 910, the one or more antennas 915 (e.g., where applicable), or any combination thereof. Although the communications manager 920 is illustrated as a separate component, in some examples, one or more functions described with reference to the communications manager 920 may be supported by or performed by the transceiver 910, one or more of the at least one processor 935, one or more of the at least one memory 925, the code 930, or any combination thereof (for example, by a processing system including at least a portion of the at least one processor 935, the at least one memory 925, the code 930, or any combination thereof). For example, the code 930 may include instructions executable by one or more of the at least one processor 935 to cause the device 905 to perform various aspects of an antenna element calibration algorithm as described herein, or the at least one processor 935 and the at least one memory 925 may be otherwise configured to, individually or collectively, perform or support such operations.

Figure 10:
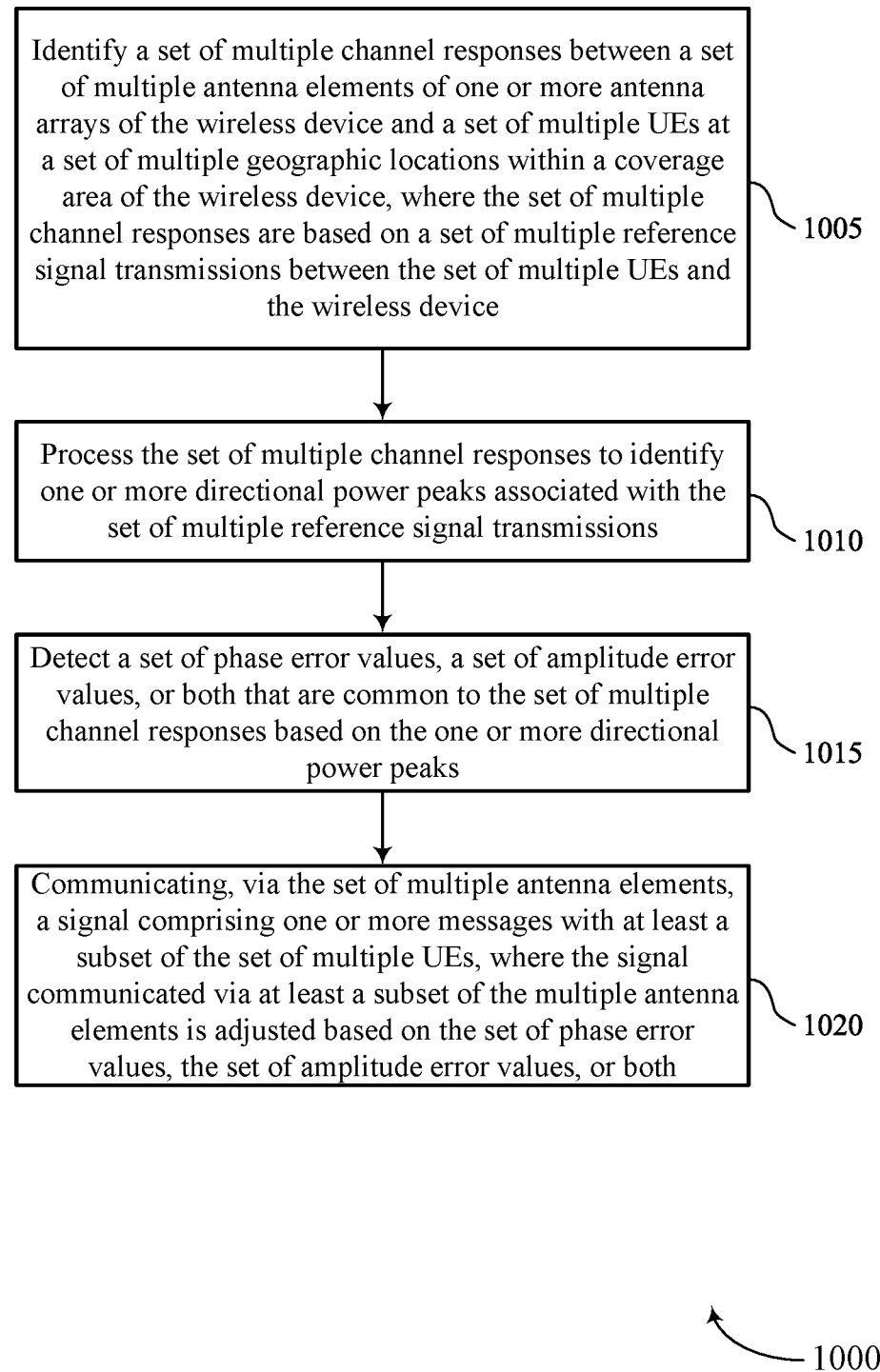
FIGS. 10 and 11 show flowcharts illustrating methods that support an antenna element calibration algorithm in accordance with one or more aspects of the present disclosure.

FIG. 10 shows a flowchart illustrating a method 1000 that supports an antenna element calibration algorithm in accordance with aspects of the present disclosure. The operations of the method 1000 may be implemented by a network entity or its components as described herein. For example, the operations of the method 1000 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1005, the method may include identifying a set of multiple channel responses between a set of multiple antenna elements of one or more antenna arrays of the wireless device and a set of multiple UEs at a set of multiple geographic locations within a coverage area of the wireless device, where the set of multiple channel responses are based on a set of multiple reference signal transmissions between the set of multiple UEs and the wireless device. The operations of block 1005 may be performed in accordance with examples as disclosed herein. In some examples, aspects of the operations of 1005 may be performed by a channel response component 825 as described with reference to FIG. 8.

At 1010, the method may include processing the set of multiple channel responses to identify one or more directional power peaks associated with the set of multiple reference signal transmissions. The operations of block 1010 may be performed in accordance with examples as disclosed herein. In some examples, aspects of the operations of 1010 may be performed by a directional power peaks component 830 as described with reference to FIG. 8.

At 1015, the method may include detecting a set of phase error values, a set of amplitude error values, or both that are common to the set of multiple channel responses based on the one or more directional power peaks. The operations of block 1015 may be performed in accordance with examples as disclosed herein. In some examples, aspects of the operations of 1015 may be performed by a phase error values component 835 as described with reference to FIG. 8.

At 1020, the method may include communicating, via the multiple antenna elements, a signal including one or more messages with at least a subset of the set of multiple UEs, where the signal communicated via at least a subset of the multiple of antenna elements is adjusted based on the set of phase error values, the set of amplitude error values, or both. The operations of block 1020 may be performed in accordance with examples as disclosed herein. In some examples, aspects of the operations of 1020 may be performed by an antenna adjustment component 840 as described with reference to FIG. 8.

Figure 11:
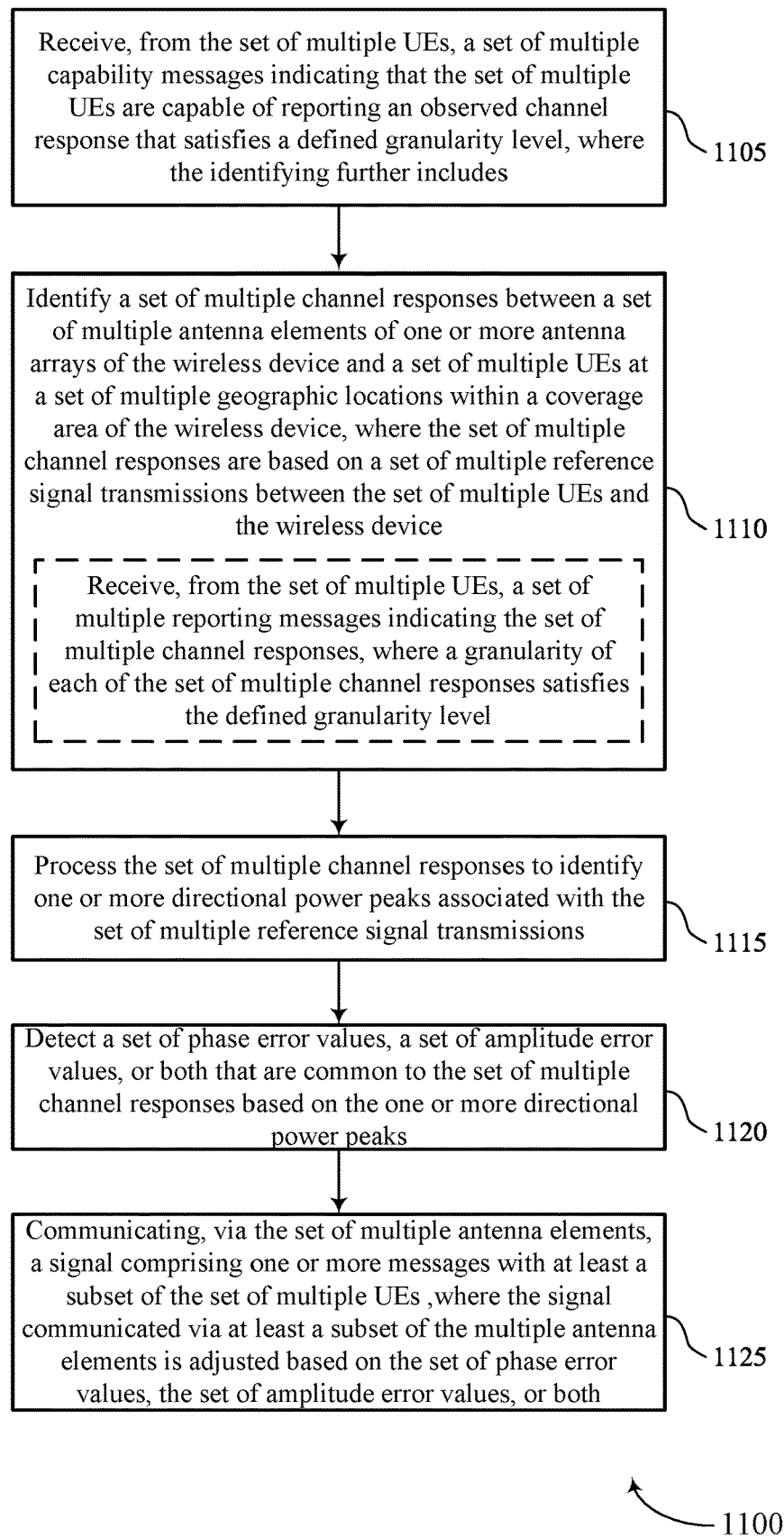

FIG. 11 shows a flowchart illustrating a method 1100 that supports an antenna element calibration algorithm in accordance with aspects of the present disclosure. The operations of the method 1100 may be implemented by a network entity or its components as described herein. For example, the operations of the method 1100 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1105, the method may include receiving, from the set of multiple UEs, a set of multiple capability messages indicating that the set of multiple UEs are capable of reporting an observed channel response that satisfies a defined granularity level, where the identifying further includes receiving multiple reporting messages indicating the multiple channel responses, where a granularity of each of the multiple channel responses satisfies the defined granularity level. The operations of block 1105 may be performed in accordance with examples as disclosed herein. In some examples, aspects of the operations of 1105 may be performed by a capability message component 845 as described with reference to FIG. 8.

At 1110, the method may include identifying a set of multiple channel responses between a set of multiple antenna elements of one or more antenna arrays of the wireless device and a set of multiple UEs at a set of multiple geographic locations within a coverage area of the wireless device, where the set of multiple channel responses are based on a set of multiple reference signal transmissions between the set of multiple UEs and the wireless device. The operations of block 1110 may be performed in accordance with examples as disclosed herein. In some examples, aspects of the operations of 1110 may be performed by a channel response component 825 as described with reference to FIG. 8.

At 1115, the method may include receiving, from the set of multiple UEs, a set of multiple reporting messages indicating the set of multiple channel responses, where a granularity of each of the set of multiple channel responses satisfies the defined granularity level. The operations of block 1115 may be performed in accordance with examples as disclosed herein. In some examples, aspects of the operations of 1115 may be performed by a channel response component 825 as described with reference to FIG. 8.

At 1120, the method may include processing the set of multiple channel responses to identify one or more directional power peaks associated with the set of multiple reference signal transmissions. The operations of block 1120 may be performed in accordance with examples as disclosed herein. In some examples, aspects of the operations of 1120 may be performed by a directional power peaks component 830 as described with reference to FIG. 8.

At 1125, the method may include detecting a set of phase error values, a set of amplitude error values, or both that are common to the set of multiple channel responses based on the one or more directional power peaks. The operations of block 1125 may be performed in accordance with examples as disclosed herein. In some examples, aspects of the operations of 1125 may be performed by a phase error values component 835 as described with reference to FIG. 8.

At 1130, the method may include communicating, via the multiple antenna elements, a signal including one or more messages with at least a subset of the set of multiple UEs, where the signal communicated via at least a subset of the multiple of antenna elements is adjusted based on the set of phase error values, the set of amplitude error values, or both. For example, the method include transmitting the signal including the one or more messages via the directional beam, where the directional beam is adjusted based on the set of phase error values. The operations of block 1130 may be performed in accordance with examples as disclosed herein. In some examples, aspects of the operations of 1130 may be performed by an antenna adjustment component 840 as described with reference to FIG. 8.

The following provides an overview of aspects of the present disclosure:

Aspect 1: A method for wireless communications by a wireless device, comprising: identifying a plurality of channel responses between a plurality of antenna elements of one or more antenna arrays of the wireless device and a plurality of UEs at a plurality of geographic locations within a coverage area of the wireless device, wherein the plurality of channel responses are based at least in part on a plurality of reference signal transmissions between the plurality of UEs and the wireless device; processing the plurality of channel responses to identify one or more directional power peaks associated with the plurality of reference signal transmissions; detecting a set of phase error values, a set of amplitude error values, or both that are common to the plurality of channel responses based at least in part on the one or more directional power peaks; and communicating, via the plurality of antenna elements, a signal comprising one or more messages with at least a subset of the plurality of UEs, wherein the signal communicated via at least a subset of the plurality of antenna elements is adjusted based at least in part on the set of phase error values, the set of amplitude error values, or both.

Aspect 2: The method of aspect 1, further comprising: receiving, from the plurality of UEs, a plurality of capability messages indicating that the plurality of UEs are capable of reporting an observed channel response that satisfies a defined granularity level, wherein the identifying further comprises: receiving, from the plurality of UEs, a plurality of reporting messages indicating the plurality of channel responses, wherein a granularity of each of the plurality of channel responses satisfies the defined granularity level.

Aspect 3: The method of aspect 2, further comprising: transmitting a plurality of capability report messages requesting the plurality of UEs to each report a capability associated with reporting the observed channel response that satisfies the defined granularity level.

Aspect 4: The method of any of aspects 1 through 3, further comprising: transmitting a control message indicating a configuration to the plurality of UEs that identifies one or more CSI-RS resources to be monitored by the plurality of UEs; and transmitting one or more CSI-RS transmissions via the one or more CSI-RS resources, wherein the identifying further comprises: receiving, from the plurality of UEs, a plurality of reporting messages indicating the plurality of channel responses based at least in part on the configuration.

Aspect 5: The method of any of aspects 1 through 4, further comprising: transmitting a control message indicating a configuration to the plurality of UEs that identifies a plurality of SRS resources, wherein the identifying further comprises: monitoring the plurality of SRS resources to generate the plurality of channel responses.

Aspect 6: The method of any of aspects 1 through 5, wherein identifying the plurality of channel responses further comprises: transmitting a plurality of reference signals to the plurality of UEs; and receiving, from the plurality of UEs, a plurality of reporting messages indicating the plurality of channel responses based at least in part on the plurality of reference signals.

Aspect 7: The method of aspect 6, wherein the plurality of reference signals are CSI-RSs that are transmitted via a plurality of CSI-RS ports, and wherein each of the plurality of CSI-RS ports is mapped to a respective antenna element of the plurality of antenna elements of the wireless device.

Aspect 8: The method of any of aspects 1 through 7, wherein processing the plurality of channel responses to identify the one or more directional power peaks further comprises: identifying the one or more directional power peaks based at least in part on a plurality of gain-phase errors for the plurality of channel responses, a plurality of steering vectors associated with the plurality of channel responses, or both.

Aspect 9: The method of any of aspects 1 through 8, wherein processing the plurality of channel responses to identify the one or more directional power peaks further comprises: identifying the one or more directional power peaks based at least in part on one or more power criterion.

Aspect 10: The method of any of aspects 1 through 9, wherein detecting the set of phase error values that are common to the plurality of channel responses further comprises: identifying a plurality of directions associated with the plurality of UEs, the plurality of directions corresponding to the plurality of channel responses; and detecting the set of phase error values based at least in part on the plurality of directions and the plurality of channel responses.

Aspect 11: The method of any of aspects 1 through 10, wherein processing the plurality of channel responses to identify one or more directional power peaks further comprises: determining a beam-space amplitude distribution based at least in part on pairs of channel responses from the plurality of channel responses that are associated with respective UE pairs from the plurality of UEs, wherein the one or more directional power peaks are identified based at least in part on the beam-space amplitude distribution.

Aspect 12: The method of any of aspects 1 through 11, wherein processing the plurality of channel responses to identify one or more directional power peaks further comprises: determining a plurality of delta angles-of-arrival for a plurality of sets of UE pairs from the plurality of UEs based at least in part on pairs of channel responses from the plurality of channel responses that are associated with respective UE pairs from the plurality of UEs, wherein the one or more directional power peaks are identified based at least in part on the plurality of delta angles-of-arrival.

Aspect 13: The method of any of aspects 1 through 12, wherein detecting the set of phase error values that are common to the plurality of channel responses further comprises: spatially aligning the plurality of channel responses by steering the plurality of channel responses to a common reference to generate a plurality of spatially aligned channel responses, wherein the set of phase error values is detected based at least in part on the plurality of spatially aligned channel responses.

Aspect 14: The method of any of aspects 1 through 13, wherein communicating via the directional beam further comprises: receiving one or more messages via the directional beam, wherein the directional beam comprises a receive beam.

Aspect 15: The method of any of aspects 1 through 14, wherein communicating via the directional beam further comprises: transmitting one or more messages via the directional beam, wherein the directional beam comprises a transmission beam.

Aspect 16: The method of any of aspects 1 through 15, wherein the plurality of channel responses are a plurality of narrowband channel responses or a plurality of wideband channel responses.

Aspect 17: The method of any of aspects 1 through 16, further comprising: receiving a plurality of reporting messages indicating a second plurality of channel responses from the plurality of UEs; and applying a transform technique to the second plurality of channel responses to identify a plurality of dominant delay paths, wherein the plurality of channel responses are identified based at least in part on the plurality of dominant delay paths.

Aspect 18: A wireless device for wireless communications, comprising one or more memories storing processor-executable code, and one or more processors coupled with the one or more memories and individually or collectively operable to execute the code to cause the wireless device to perform a method of any of aspects 1 through 17.

Aspect 19: A wireless device for wireless communications, comprising at least one means for performing a method of any of aspects 1 through 17.

Aspect 20: A non-transitory computer-readable medium storing code for wireless communications, the code comprising instructions executable by one or more processors to perform a method of any of aspects 1 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A wireless device, comprising:
one or more memories storing processor-executable code; and
one or more processors coupled with the one or more memories and individually or collectively operable to execute the code to cause the wireless device to:
identify a plurality of channel responses between a plurality of antenna elements of one or more antenna arrays of the wireless device and a plurality of UEs at a plurality of geographic locations within a coverage area of the wireless device, wherein the plurality of channel responses are based at least in part on a plurality of reference signal transmissions between the plurality of UEs and the wireless device;
process the plurality of channel responses to identify one or more directional power peaks associated with the plurality of reference signal transmissions;
detect a set of phase error values, a set of amplitude error values, or both that are common to the plurality of channel responses based at least in part on the one or more directional power peaks; and
communicate, via the plurality of antenna elements, a signal comprising one or more messages with at least a subset of the plurality of UEs, wherein the signal communicated via at least a subset of the plurality of antenna elements is adjusted based at least in part on the set of phase error values, the set of amplitude error values, or both.

2. The wireless device of claim 1, wherein the one or more processors are individually or collectively further operable to execute the code to cause the wireless device to:
receive, from the plurality of UEs, a plurality of capability messages indicating that the plurality of UEs are capable of reporting an observed channel response that satisfies a defined granularity level, wherein, to identify the plurality of channel responses, the one or more processors are individually or collectively further operable to execute the code to cause the wireless device to:
receive, from the plurality of UEs, a plurality of reporting messages indicating the plurality of channel responses, wherein a granularity of each of the plurality of channel responses satisfies the defined granularity level.

3. The wireless device of claim 2, wherein the one or more processors are individually or collectively further operable to execute the code to cause the wireless device to:
transmit a plurality of capability report messages requesting the plurality of UEs to each report a capability associated with reporting the observed channel response that satisfies the defined granularity level.

4. The wireless device of claim 1, wherein the one or more processors are individually or collectively further operable to execute the code to cause the wireless device to:
transmit a control message indicating a configuration to the plurality of UEs that identifies one or more channel state information-reference signal (CSI-RS) resources to be monitored by the plurality of UEs; and
transmit one or more CSI-RS transmissions via the one or more CSI-RS resources, wherein, to identify the plurality of channel responses, the one or more processors are individually or collectively further operable to execute the code to cause the wireless device to:
receive, from the plurality of UEs, a plurality of reporting messages indicating the plurality of channel responses based at least in part on the configuration.

5. The wireless device of claim 1, wherein the one or more processors are individually or collectively further operable to execute the code to cause the wireless device to:
transmit a control message indicating a configuration to the plurality of UEs that identifies a plurality of sounding reference signal (SRS) resources, wherein, to identify the plurality of channel responses, the one or more processors are individually or collectively further operable to execute the code to cause the wireless device to:
monitor the plurality of SRS resources to generate the plurality of channel responses.

6. The wireless device of claim 1, wherein, to identify the plurality of channel responses, the one or more processors are individually or collectively further operable to execute the code to cause the wireless device to:
transmit a plurality of reference signals to the plurality of UEs; and
receive, from the plurality of UEs, a plurality of reporting messages indicating the plurality of channel responses based at least in part on the plurality of reference signals.

7. The wireless device of claim 6, wherein the plurality of reference signals are channel state information-reference signals (CSI-RSs) that are transmitted via a plurality of CSI-RS ports, and wherein each of the plurality of CSI-RS ports is mapped to a respective antenna element of the plurality of antenna elements of the wireless device.

8. The wireless device of claim 1, wherein, to process the plurality of channel responses to identify the one or more directional power peaks, the one or more processors are individually or collectively further operable to execute the code to cause the wireless device to:
identify the one or more directional power peaks based at least in part on a plurality of gain-phase errors for the plurality of channel responses, a plurality of steering vectors associated with the plurality of channel responses, or both.

9. The wireless device of claim 1, wherein, to process the plurality of channel responses to identify the one or more directional power peaks, the one or more processors are individually or collectively further operable to execute the code to cause the wireless device to:
identify the one or more directional power peaks based at least in part on one or more power criterion.

10. The wireless device of claim 1, wherein, to detect the set of phase error values that are common to the plurality of channel responses, the one or more processors are individually or collectively further operable to execute the code to cause the wireless device to:
identify a plurality of directions associated with the plurality of UEs, the plurality of directions corresponding to the plurality of channel responses; and
detect the set of phase error values based at least in part on the plurality of directions and the plurality of channel responses.

11. The wireless device of claim 1, wherein, to process the plurality of channel responses to identify the one or more directional power peaks, the one or more processors are individually or collectively further operable to execute the code to cause the wireless device to:
determine a beam-space amplitude distribution based at least in part on pairs of channel responses from the plurality of channel responses that are associated with respective UE pairs from the plurality of UEs, wherein the one or more directional power peaks are identified based at least in part on the beam-space amplitude distribution.

12. The wireless device of claim 1, wherein, to process the plurality of channel responses to identify the one or more directional power peaks, the one or more processors are individually or collectively further operable to execute the code to cause the wireless device to:
determine a plurality of delta angles-of-arrival for a plurality of sets of UE pairs from the plurality of UEs based at least in part on pairs of channel responses from the plurality of channel responses that are associated with respective UE pairs from the plurality of UEs, wherein the one or more directional power peaks are identified based at least in part on the plurality of delta angles-of-arrival.

13. The wireless device of claim 1, wherein, to detect the set of phase error values that are common to the plurality of channel responses, the one or more processors are individually or collectively further operable to execute the code to cause the wireless device to:
spatially align the plurality of channel responses by steering the plurality of channel responses to a common reference to generate a plurality of spatially aligned channel responses, wherein the set of phase error values is detected based at least in part on the plurality of spatially aligned channel responses.

14. The wireless device of claim 1, wherein, to communicate via the plurality of antenna elements, the one or more processors are individually or collectively further operable to execute the code to cause the wireless device to:
receive the signal comprising the one or more messages via a directional beam, wherein the directional beam comprises a receive beam.

15. The wireless device of claim 1, wherein, to communicate via the plurality of antenna elements, the one or more processors are individually or collectively further operable to execute the code to cause the wireless device to:
transmit the signal comprising the one or more messages via a directional beam, wherein the directional beam comprises a transmission beam.

16. The wireless device of claim 1, wherein the plurality of channel responses are a plurality of narrowband channel responses or a plurality of wideband channel responses.

17. The wireless device of claim 1, wherein the one or more processors are individually or collectively further operable to execute the code to cause the wireless device to:
receive a plurality of reporting messages indicating a second plurality of channel responses from the plurality of UEs; and
apply a transform technique to the second plurality of channel responses to identify a plurality of dominant delay paths, wherein the plurality of channel responses are identified based at least in part on the plurality of dominant delay paths.

18. A method for wireless communications by a wireless device, comprising:
identifying a plurality of channel responses between a plurality of antenna elements of one or more antenna arrays of the wireless device and a plurality of UEs at a plurality of geographic locations within a coverage area of the wireless device, wherein the plurality of channel responses are based at least in part on a plurality of reference signal transmissions between the plurality of UEs and the wireless device;
processing the plurality of channel responses to identify one or more directional power peaks associated with the plurality of reference signal transmissions;
detecting a set of phase error values, a set of amplitude error values, or both that are common to the plurality of channel responses based at least in part on the one or more directional power peaks; and
communicating, via the plurality of antenna elements, a signal comprising one or more messages with at least a subset of the plurality of UEs, wherein the signal communicated via at least a subset of the plurality of antenna elements is adjusted based at least in part on the set of phase error values, the set of amplitude error values, or both.

19. The method of claim 18, further comprising:
receiving, from the plurality of UEs, a plurality of capability messages indicating that the plurality of UEs are capable of reporting an observed channel response that satisfies a defined granularity level, wherein the identifying further comprises:
receiving, from the plurality of UEs, a plurality of reporting messages indicating the plurality of channel responses, wherein a granularity of each of the plurality of channel responses satisfies the defined granularity level.

20. The method of claim 19, further comprising:
transmitting a plurality of capability report messages requesting the plurality of UEs to each report a capability associated with reporting the observed channel response that satisfies the defined granularity level.

21. The method of claim 18, further comprising:
transmitting a control message indicating a configuration to the plurality of UEs that identifies one or more channel state information-reference signal (CSI-RS) resources to be monitored by the plurality of UEs; and
transmitting one or more CSI-RS transmissions via the one or more CSI-RS resources, wherein the identifying further comprises:
receiving, from the plurality of UEs, a plurality of reporting messages indicating the plurality of channel responses based at least in part on the configuration.

22. The method of claim 18, further comprising:
transmitting a control message indicating a configuration to the plurality of UEs that identifies a plurality of sounding reference signal (SRS) resources, wherein the identifying further comprises:
monitoring the plurality of SRS resources to generate the plurality of channel responses.

23. The method of claim 18, wherein identifying the plurality of channel responses further comprises:
transmitting a plurality of reference signals to the plurality of UEs; and
receiving, from the plurality of UEs, a plurality of reporting messages indicating the plurality of channel responses based at least in part on the plurality of reference signals.

24. The method of claim 23, wherein the plurality of reference signals are channel state information-reference signals (CSI-RSs) that are transmitted via a plurality of CSI-RS ports, and wherein each of the plurality of CSI-RS ports is mapped to a respective antenna element of the plurality of antenna elements of the wireless device.

25. The method of claim 18, wherein processing the plurality of channel responses to identify the one or more directional power peaks further comprises:

identifying the one or more directional power peaks based at least in part on a plurality of gain-phase errors for the plurality of channel responses, a plurality of steering vectors associated with the plurality of channel responses, or both.

26. A wireless device, comprising:
means for identifying a plurality of channel responses between a plurality of antenna elements of one or more antenna arrays of the wireless device and a plurality of UEs at a plurality of geographic locations within a coverage area of the wireless device, wherein the plurality of channel responses are based at least in part on a plurality of reference signal transmissions between the plurality of UEs and the wireless device;
means for processing the plurality of channel responses to identify one or more directional power peaks associated with the plurality of reference signal transmissions;
means for detecting a set of phase error values, a set of amplitude error values, or both that are common to the plurality of channel responses based at least in part on the one or more directional power peaks; and
means for communicating, via the plurality of antenna elements, a signal comprising one or more messages with at least a subset of the plurality of UEs, wherein the signal communicated via at least a subset of the plurality of antenna elements is adjusted based at least in part on the set of phase error values, the set of amplitude error values, or both.

27. The wireless device of claim 26, further comprising:
means for receiving the signal comprising the one or more messages via a directional beam, wherein the directional beam comprises a receive beam.

28. The wireless device of claim 26, further comprising:
means for transmitting the signal comprising the one or more messages via a directional beam, wherein the directional beam comprises a transmission beam.

29. A non-transitory computer-readable medium storing code for wireless communications, the code comprising instructions executable by one or more processors to:
identify a plurality of channel responses between a plurality of antenna elements of one or more antenna arrays of a wireless device and a plurality of UEs at a plurality of geographic locations within a coverage area of the wireless device, wherein the plurality of channel responses are based at least in part on a plurality of reference signal transmissions between the plurality of UEs and the wireless device;
process the plurality of channel responses to identify one or more directional power peaks associated with the plurality of reference signal transmissions;
detect a set of phase error values, a set of amplitude error values, or both that are common to the plurality of channel responses based at least in part on the one or more directional power peaks; and
communicate, via the plurality of antenna elements, a signal comprising one or more messages with at least a subset of the plurality of UEs, wherein the signal communicated via at least a subset of the plurality of antenna elements is adjusted based at least in part on the set of phase error values, the set of amplitude error values, or both.

30. The non-transitory computer-readable medium of claim 29, wherein the instructions to process the plurality of channel responses to identify the one or more directional power peaks are further executable by the one or more processors to:
identify the one or more directional power peaks based at least in part on one or more power criterion.

* * * * *